May 12, 1964 E. KOPPELMAN ETAL 3,132,671
METHODS OF AND APPARATUS FOR WEAVING SHAPED
FABRICS AND ARTICLES WOVEN THEREBY
Original Filed Nov. 20, 1956 13 Sheets-Sheet 2

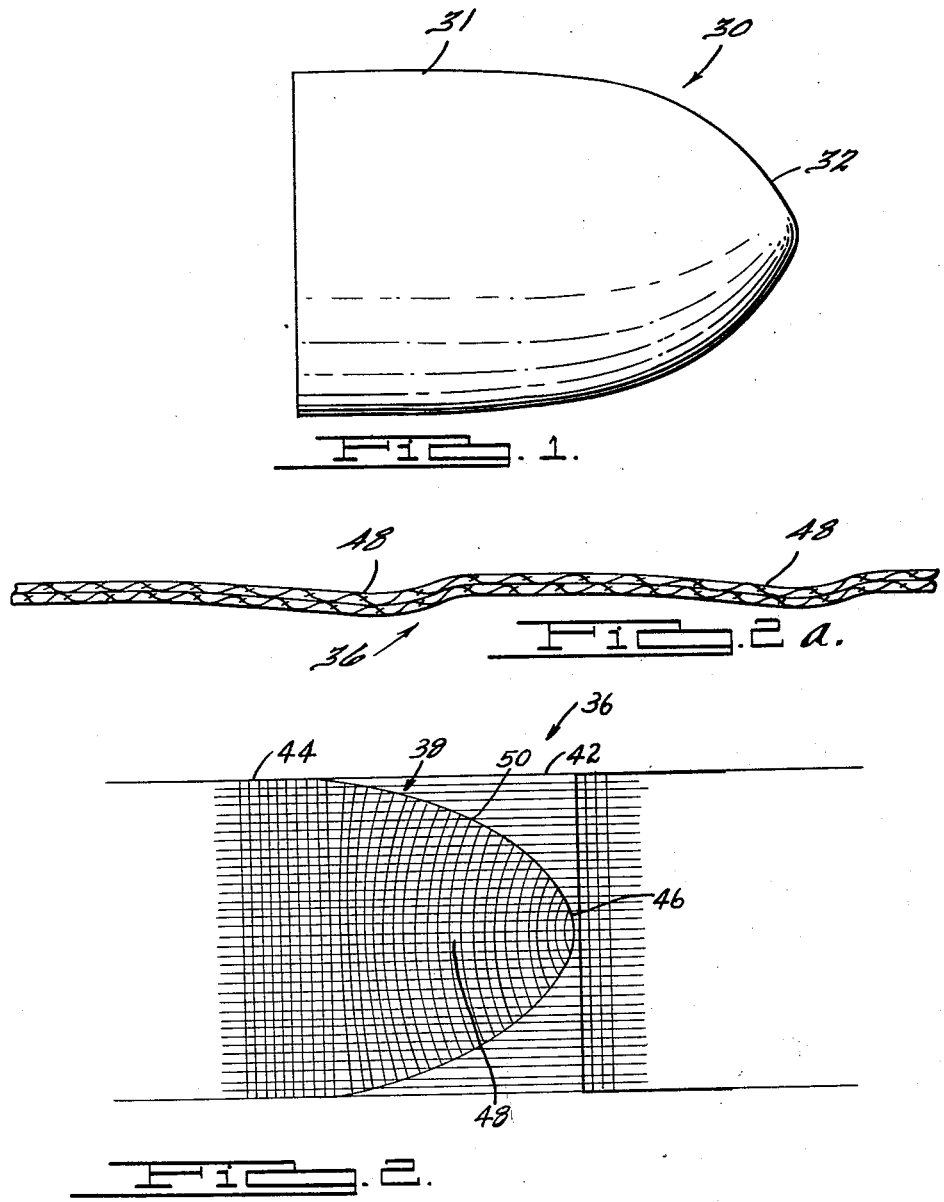

INVENTORS
Edward Koppelman.
Arthur R. Campman.
BY
Harness, Dickey & Pierce.
ATTORNEYS.

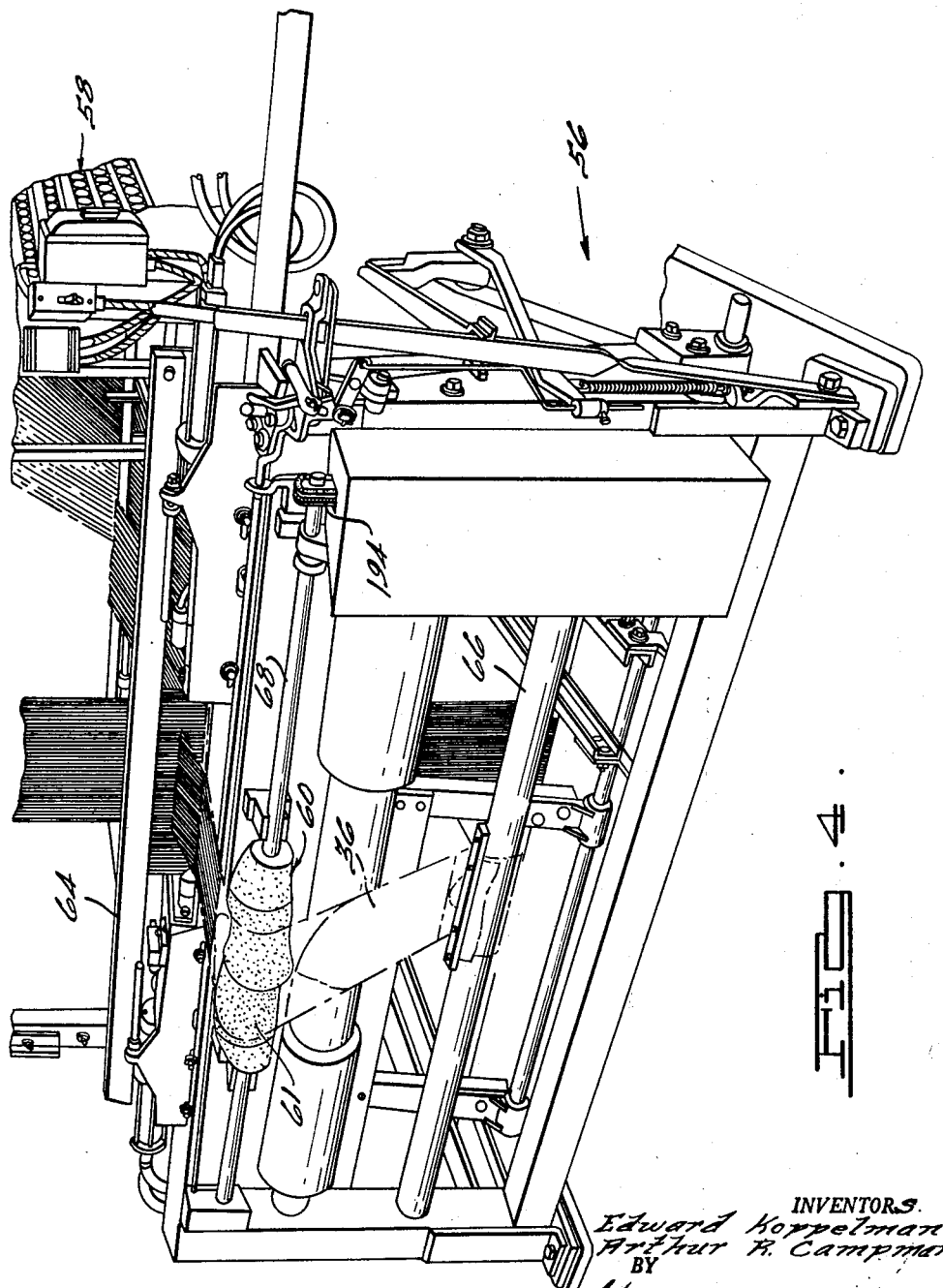

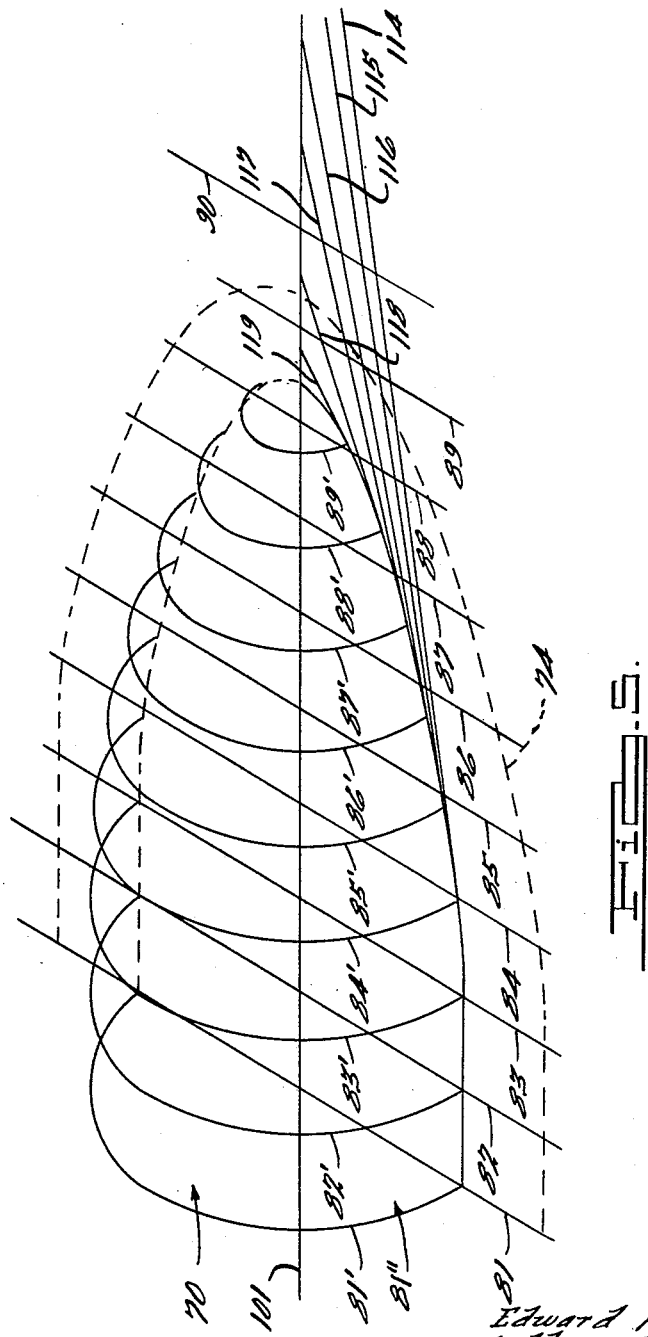

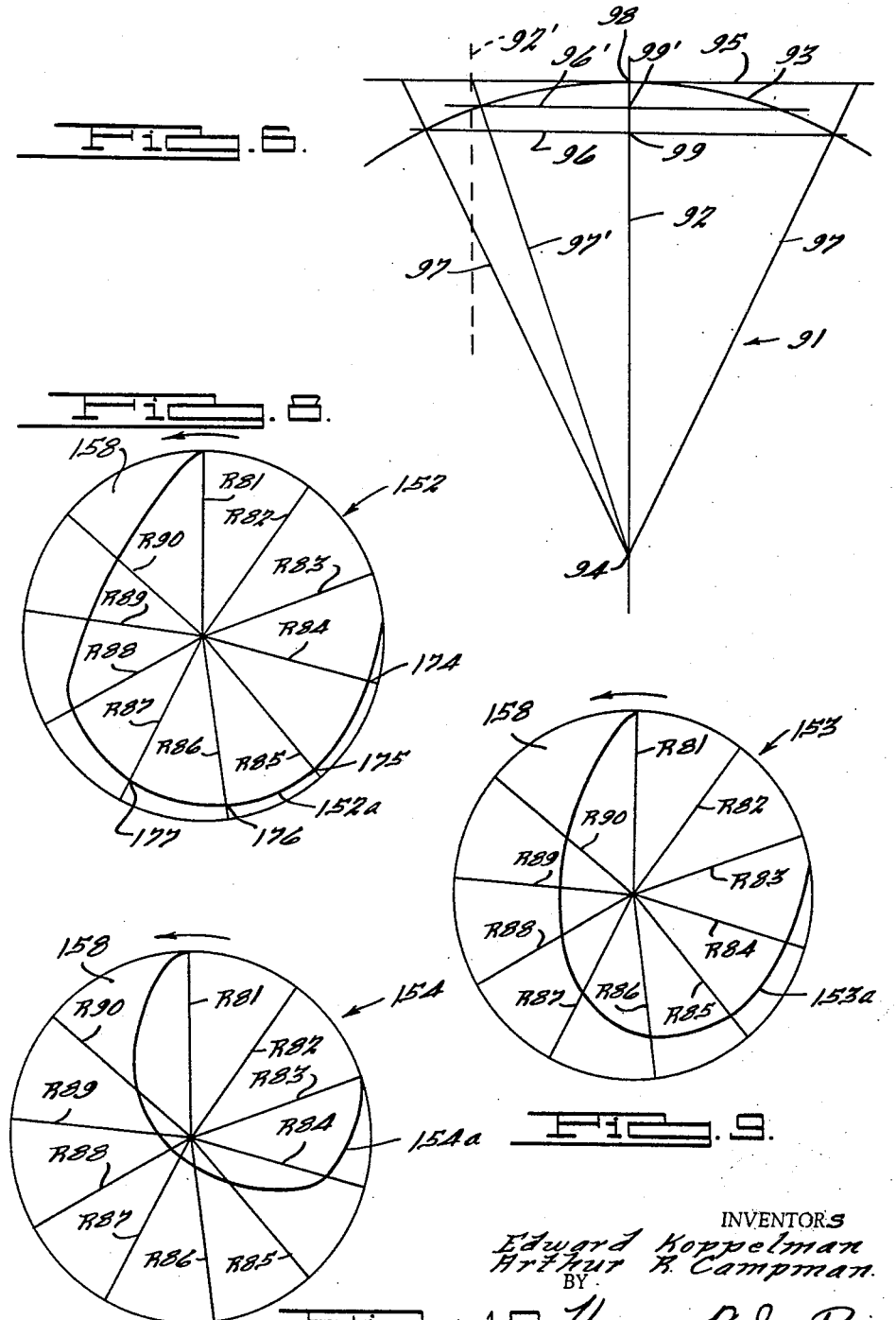

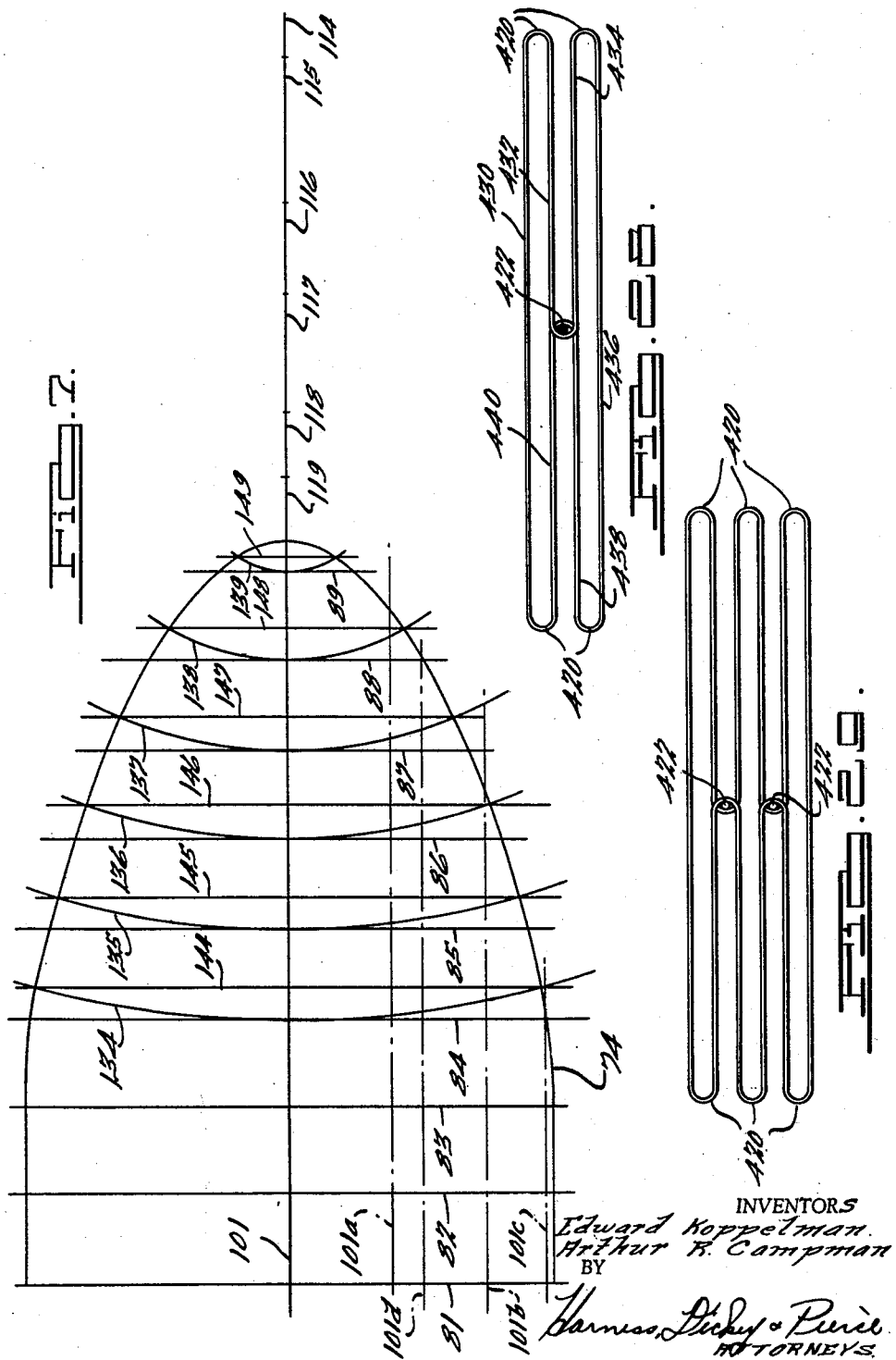

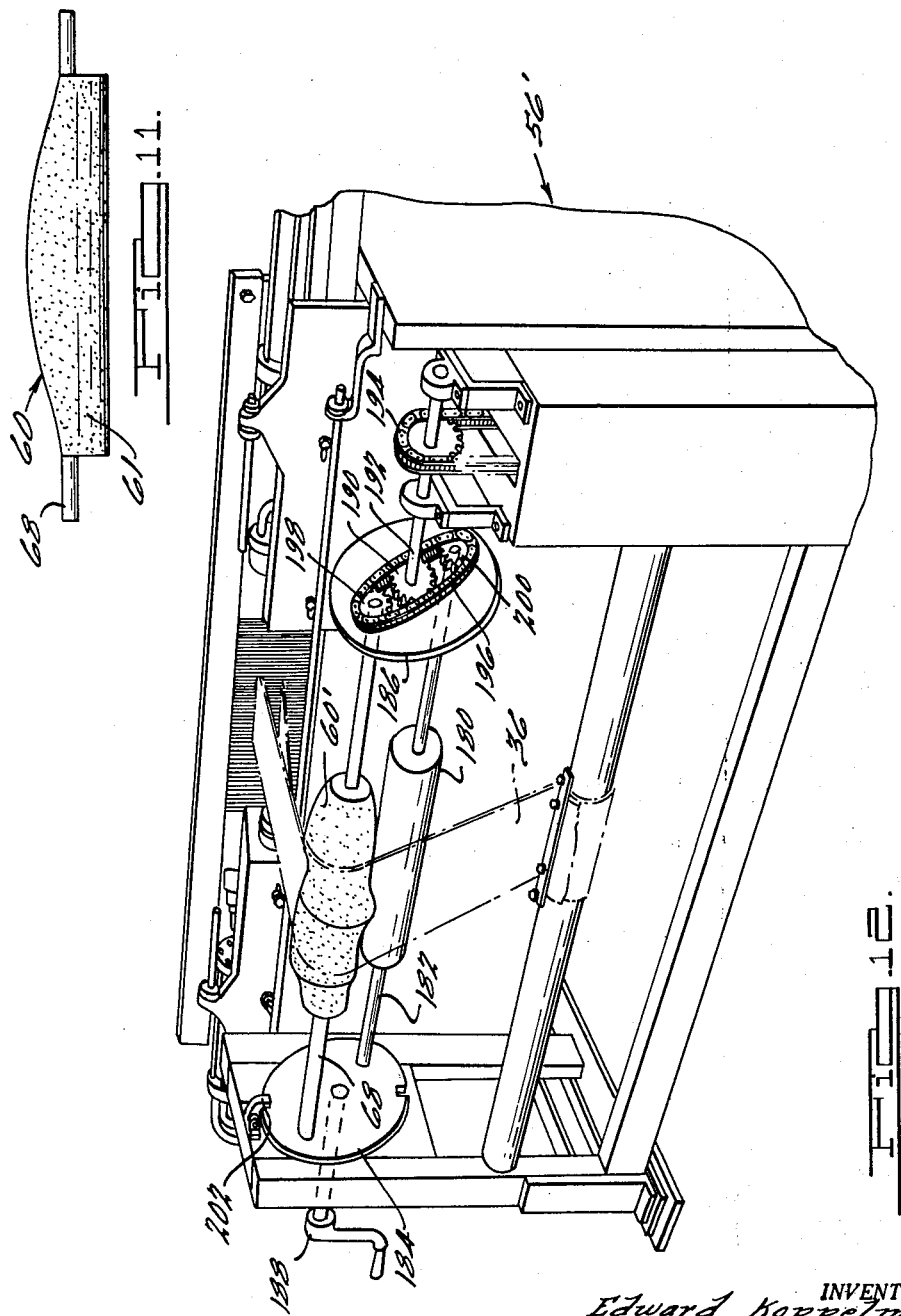

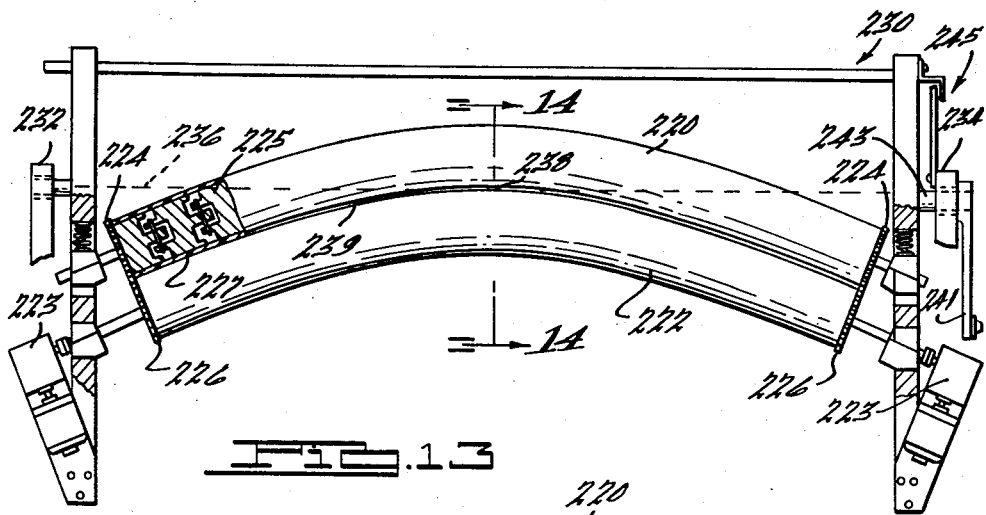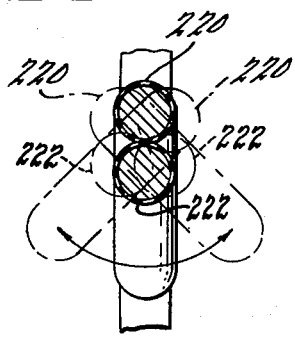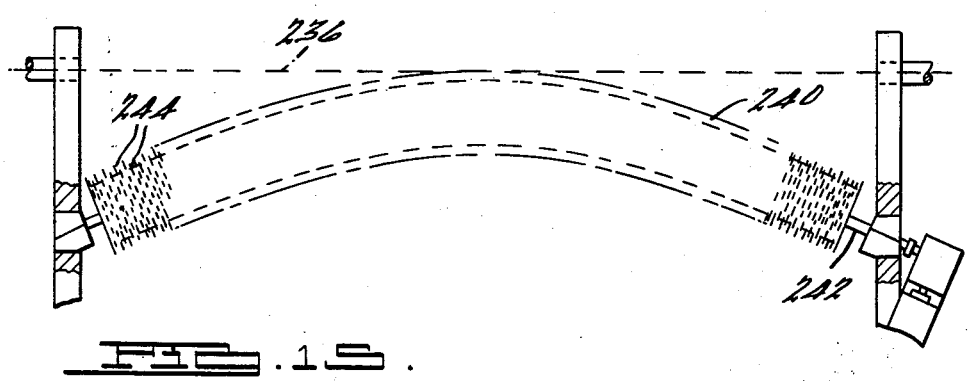

May 12, 1964   E. KOPPELMAN ETAL   3,132,671
METHODS OF AND APPARATUS FOR WEAVING SHAPED
FABRICS AND ARTICLES WOVEN THEREBY
Original Filed Nov. 20, 1956   13 Sheets-Sheet 9
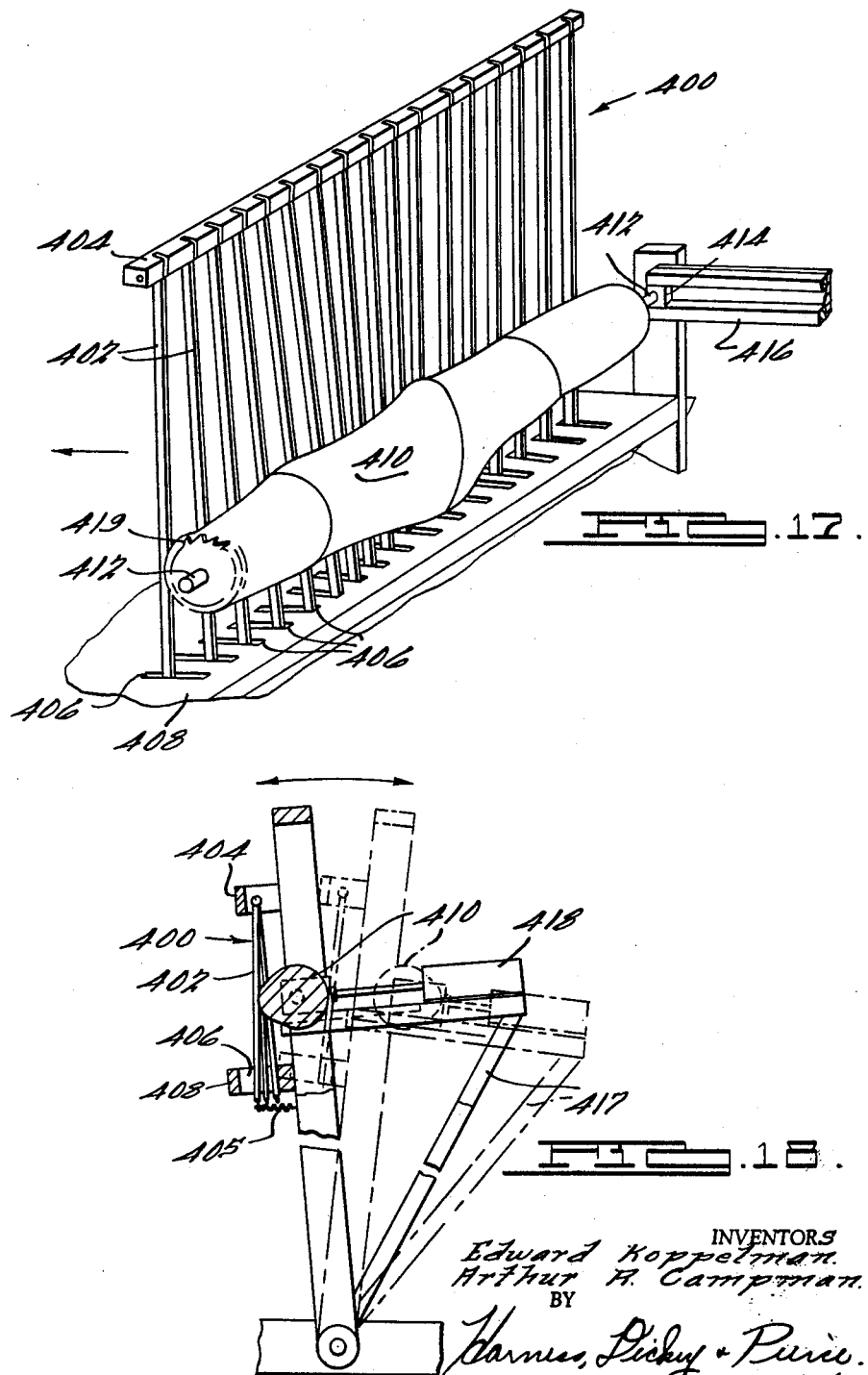
INVENTORS
Edward Koppelman.
Arthur R. Campman.
BY
Harness, Dickey & Pierce.
ATTORNEYS.

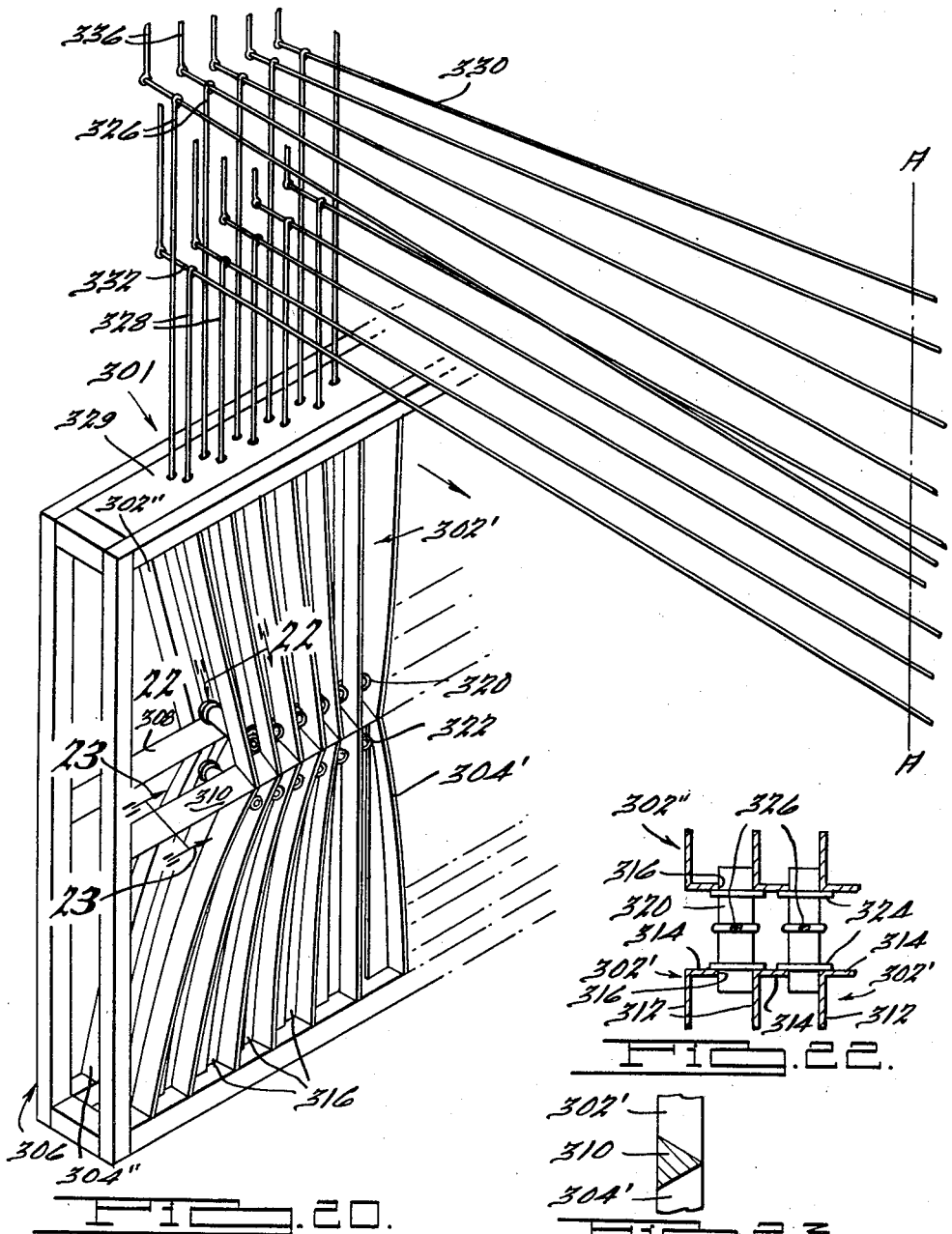

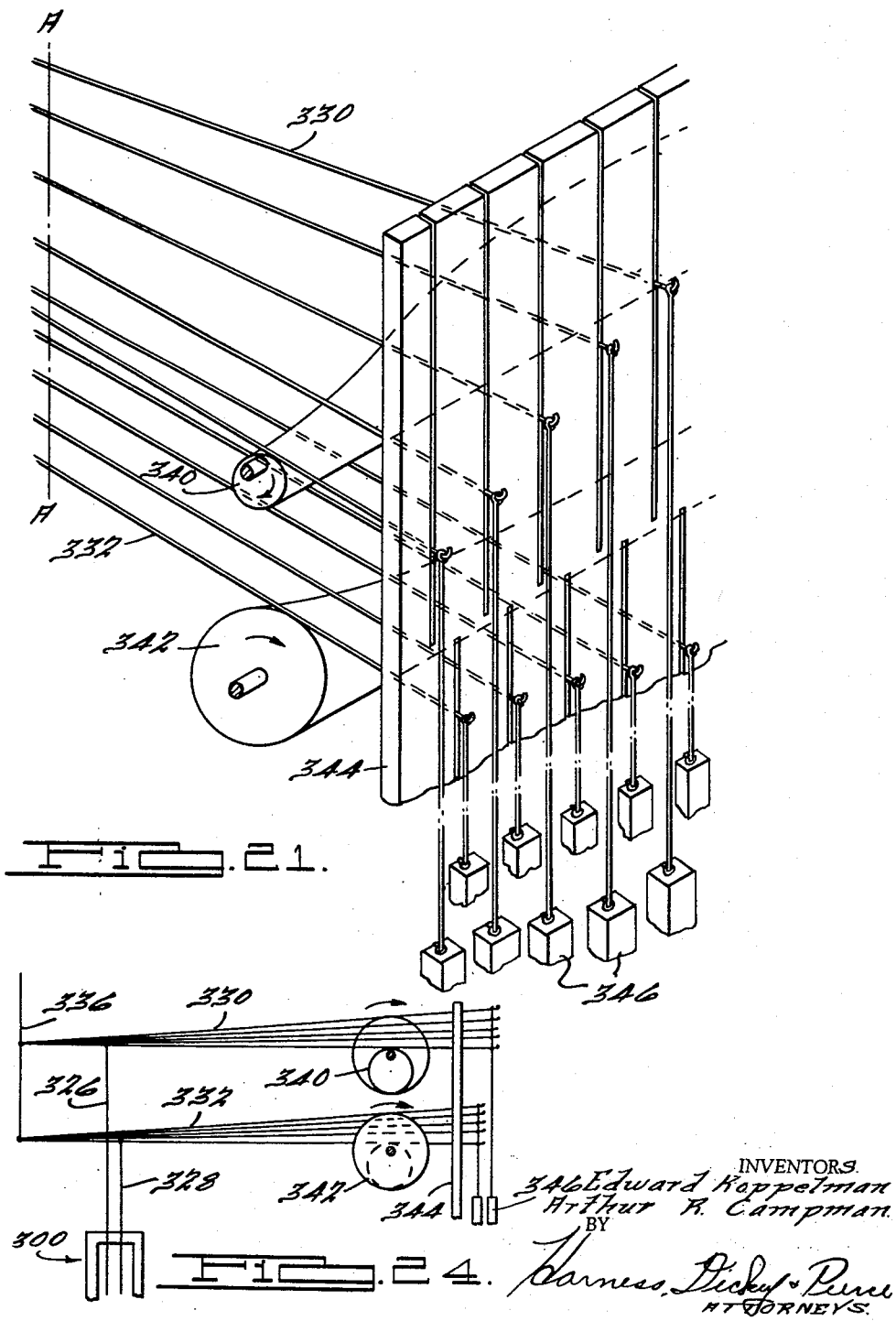

May 12, 1964   E. KOPPELMAN ETAL   3,132,671
METHODS OF AND APPARATUS FOR WEAVING SHAPED
FABRICS AND ARTICLES WOVEN THEREBY
Original Filed Nov. 20, 1956   13 Sheets-Sheet 13

INVENTORS.
Edward Koppelman.
Arthur R. Campman.
BY
Harness, Dickey & Pierce
ATTORNEYS.

United States Patent Office 3,132,671
Patented May 12, 1964

3,132,671
METHODS OF AND APPARATUS FOR WEAVING SHAPED FABRICS AND ARTICLES WOVEN THEREBY
Edward Koppelman, Huntington Park, and Arthur R. Campman, Los Angeles, Calif., assignors, by mesne assignments, to Raymond Development Industries, Inc., Huntington Park, Calif., a corporation of Delaware
Original application Nov. 20, 1956, Ser. No. 623,366, now Patent No. 2,998,030, dated Aug. 29, 1961. Divided and this application Mar. 6, 1961, Ser. No. 93,388.
13 Claims. (Cl. 139—11)

This invention relates to improved methods of and apparatus for weaving curvilinear fabrics, and to improved fabrics woven thereby. This application is a division from co-pending application Serial No. 623,366 filed November 20, 1956 and now Patent No. 2,998,030.

There is an increased need for curvilinear woven fabrics shaped with a relatively high degree of accuracy to a predetermined form, and having relatively high strength and good uniformity of density throughout their areas. Such fabrics are especially advantageous in, for example, the fiber-reinforced plastics industry where shaped articles are made by laying up layers of raw resin impregnated fabric upon a shaped mandrel and subsequently curing the resin to form a laminated article. Heretofore flat woven fabrics have been used in such processes, and uniform density of the articles produced has been relatively difficult to achieve, especially in the tapered portions of the articles, since flat fabrics cannot be readily wound upon a curvilinear mandrel in a smooth fashion. A substantial amount of hand cutting and skilled fitting has heretofore been required in laying up fabric upon a curvilinearly shaped mandrel, and the cost of laminated articles formed thereby has heretofore been relatively high.

The practice of the present invention provides shaped, woven fabrics which may be made to conform closely to any desired surface contour and to fit smoothly upon a shaped mandrel without cutting or skilled fitting operations. Fiber reinforced articles of greatly increased strength, improved appearance, and reduced cost may be readily made using shaped fabric lamina according to the present invention. Instead of fitting flat fabrics upon curvilinear mandrels, "socks" may now be woven conforming in shape to the mandrels and simply slipped on the mandrels with ease.

Moreover, in curing the resins in previous such articles, relatively difficult vacuum or pressure bag techniques were used because of the relatively uneven surfaces presented by the wrapped fabrics, and because of the difficulty of holding wrapped fabrics in their desired positions without slippage. Now, according to the present invention, fabrics may be shaped to fit the mandrels closely and accurately and the resins may be cured by so-called "matched metal molding," a process wherein a mating die is fitted in engagement with the mandrel and the impregnated fabric is compressed and heated between the die and the mandrel to cure the resin. Matched metal molding is capable of producing stronger and more uniform materials than previous bagging techniques since greater pressure and heat can be used. Other advantages such as those relating to improved strength will become apparent through a reading of this specification.

Accordingly, one important object of the present invention is to provide improved methods of weaving curvilinear fabrics.

Another object is to provide improved woven fabrics shaped to conform to predetermined curvilinear surfaces, and to provide improved fabric reinforced plastic articles including such fabrics.

Another object is to provide improved apparatus for weaving curvilinear fabrics.

These and other objects are accomplished by the present invention, according to which a curvilinear fabric may be woven conforming with a relatively high degree of accuracy to a predetermined surface contour. The fabric may be woven on a specially modified loom, using a conventional Jacquard head to raise and lower the warp ends to form the weaving sheds in which the filling threads are laid. Shaping is accomplished by drawing the filling threads into different predetermined arcuate positions in the warp as the fabric is woven. This may be done according to the present invention by any of three principal methods. The first method comprises varying the rates of take up of the warp ends as a function of both the progress of the weaving and the positions of the different ends across the width of the warp. After each fill thread is beaten up and locked in the warp, the warp is advanced in a predetermined manner to draw the fill thread into a predetermined arcuate position. The second method comprises the use of a novel reed to beat up successive fill threads into different predetermined arcuate positions, the warp travel being kept constant and uniform. The third method comprises weaving the fabric in an open, or extended form, each fill thread when it is beaten up being positioned along a predetermined curve lying in a plane perpendicular to the direction of weaving.

The invention also provides improved apparatus to weave fabrics according to the methods described herein. According to one embodiment of the invention, apparatus for weaving by the first method comprises a specially shaped take-up roll over which a fabric is trained as it comes off the loom. The roll is shaped to take up different warp ends at different, continuously changing rates as the fabric is woven, thus drawing successive fill threads into successive, different arcuate positions to shape the fabric to conform to a predetermined surface contour. According to another embodiment, the variable warp take-up may be accomplished by a bent bar take-up roll which, in addition to rotating about its own arcuate axis, is selectively rotated about a straight axis as the weaving progresses.

Apparatus for weaving by the second method of the invention comprises a reed having pivoted dent wires positionable by a shaped cam, which is rotated as the weaving progresses so that successive picks are beaten up into different predetermined arcuate positions.

Apparatus according to the invention for weaving shaped fabrics in an open, or extended form comprises a fan-shaped reed having curved dent wires, and heddle means to position the warp to conform to desired predetermined contours during successive sweeps of the reed.

Fabrics woven according to the methods and upon apparatus of the invention are generally characterized by evenly spaced warp ends and a helical filling which forms substantially planar loops, or hoops when the fabric is extended to its full natural shape. Laminated fiber reinforced plastic articles made with shaped fabrics according to the invention are characterized by increased strength since each layer of reinforcing fabric is unitary and the fill threads lie in substantially circular hoops around the article. Moreover, production costs are significantly lowered because skilled hand fitting is not required and relatively inexpensive matched metal molding may be used in place of vacuum or pressure bag molding methods.

The invention will now be described in greater detail in connection with the accompanying drawings of which:

FIG. 2 is a plan view of a fabric woven according to the invention on flat weaving apparatus, such fabric being shown collapsed, but such fabric being capable of being extended to fit the surface shown in FIG. 1;

FIG. 2a is a longitudinal section of the fabric shown in FIG. 2;

FIG. 4 is a fragmentary, perspective view of a loom including a cam-shaped take-up roll according to the invention;

FIG. 5 is an isometric view of a chart illustrating one step in the determination of the shape of the cam-shaped take-up roll shown in FIG. 4;

FIG. 6 is a chart illustrating the principles of curvilinear weaving according to one embodiment of the invention;

FIG. 7 is a plan view of a chart illustrating a second step in the determination of the shape of the cam-shaped take-up roll shown in FIG. 4;

FIG. 8 is a chart illustrating a third step in the determination of the shape of the cam-shaped take-up roll as shown in FIG. 4, particularly showing the cross section of the roll in one plane;

FIG. 9 is a chart similar to the one shown in FIG. 8, but particularly showing the cross section of the roll in a second plane;

FIG. 10 is a chart similar to the one shown in FIG. 8, but particularly showing the cross section of the roll in a third plane;

FIG. 11 is a front elevational view of a cam-shaped take-up roll according to the invention;

FIG. 12 is a fragmentary, perspective view of a loom including a cam-shaped take-up roll according to a modification of the invention, the roll being mounted for selective alternate use with a conventional cylindrical take-up roll;

FIG. 13 is a fragmentary, schematic view of a bent bar take-up roll assembly according to the invention;

FIG. 14 is a cross section of the bent bar take-up assembly shown in FIG. 13, taken along the line 14—14 thereof;

FIG. 15 is a fragmentary, elevational view of a modified form of a bent bar take-up roll assembly according to the invention;

Figure 19:
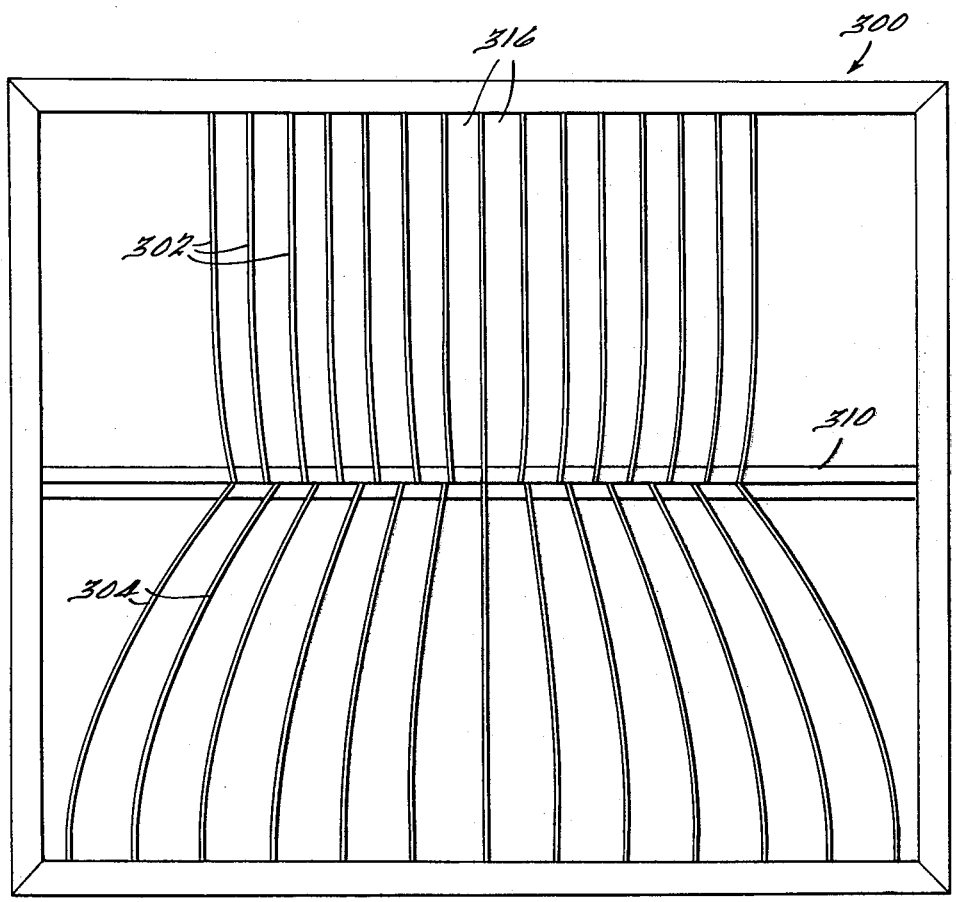
Figure 25:
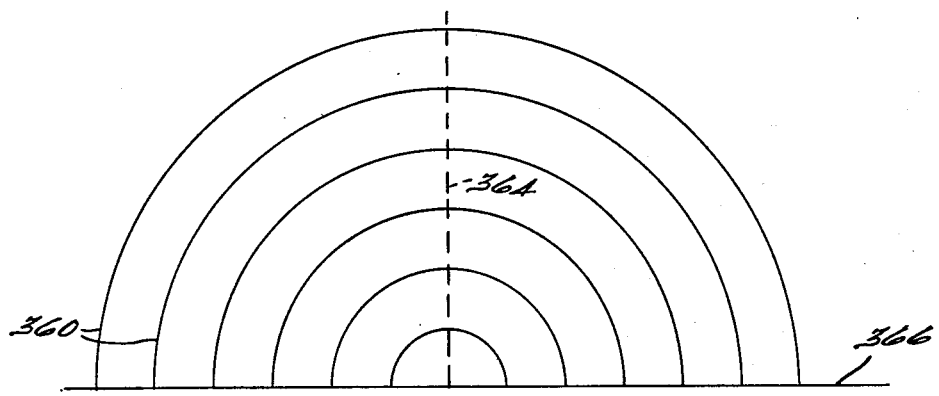
Figure 26:
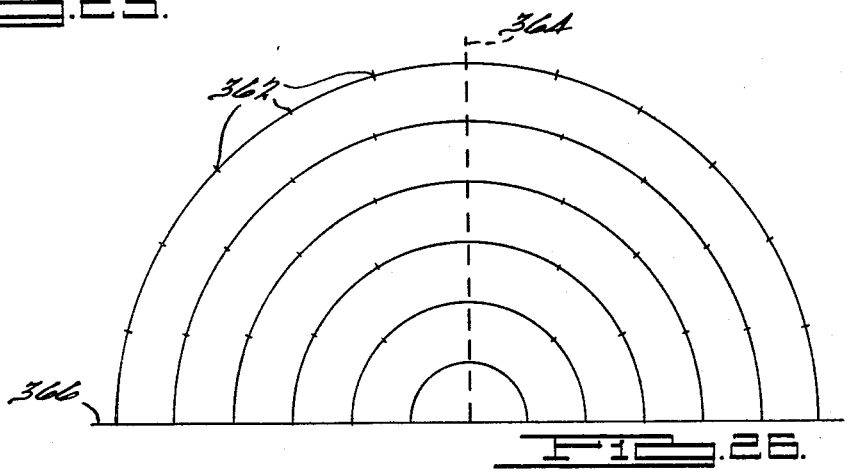
Figure 27:
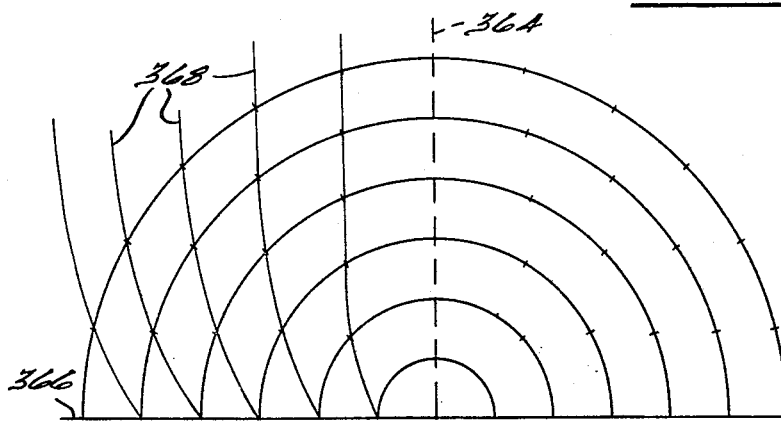

FIG. 16, which appears on sheet 2, is a diagrammatic view illustrating the use of two bent bar roll assemblies for weaving curvilinear fabrics according to the invention using a warp beam;

FIG. 17 is a fragmentary, schematic view of a pivoted dent wire reed according to the present invention;

FIG. 18 is a schematic, cross-sectional view of the reed shown in FIG. 17, showing the reed mounted upon the lay of a loom;

FIG. 19 is an elevational view of a fan-shaped reed having curved dent wires according to the invention, the reed shown being adapted especially for weaving fabrics in open form;

FIG. 20 is a fragmentary, partly schematic, isometric view of the fan reed shown in FIG. 19 together with heddles and heddle control means cooperative therewith;

FIG. 21 is a fragmentary, partly schematic, isometric view of a portion of the heddle control means used with the fan reed. FIGS. 20 and 21, taken together, constitute a single view, and may be joined together along the dash line A—A;

FIG. 22 is a horizontal section of a portion of the fan reed shown in FIG. 20, taken along the line 22—22 thereof;

FIG. 23 is a cross section of a portion of the fan reed shown in FIG. 20, taken along the line 23—23 thereof;

FIG. 24 is a schematic, side elevational view of the apparatus illustrated in FIGS. 20 and 21;

FIG. 25 is a chart illustrating one step in the determination of the shapes of the dent wires of the fan reed shown in FIG. 19;

FIG. 26 is a chart illustrating a second step in the determination of the dent wire shapes of the fan reed shown in FIG. 19;

FIG. 27 is a chart illustrating a third step in the determination of the dent wire shapes of the fan reed shown in FIG. 19;

FIG. 28 (Sheet 6) is a schematic, cross-sectional view of a fabric woven in double folds according to the invention; and FIG. 29 is a schematic, cross-sectional view of a fabric woven in quadruple folds according to the invention.

Figure 1B:
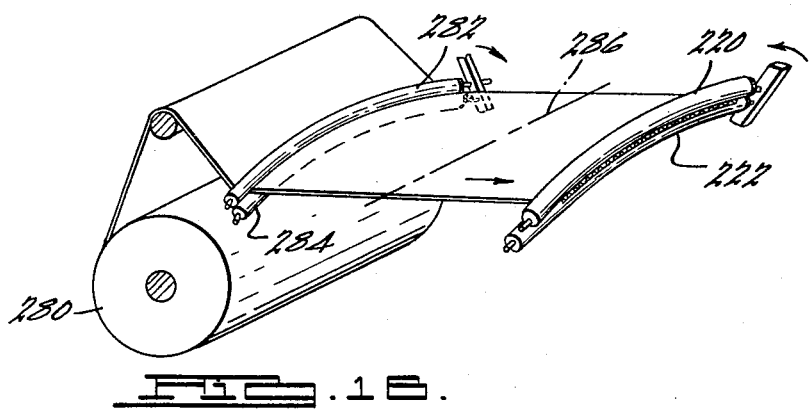
FIGURE 1 is an elevational view of an object having a portion of ogive shape, illustrating one surface contour that may be readily fitted by fabrics woven according to the invention.

Referring now to the drawings, FIG. 1 illustrates a shaped object 30 having a cylindrical body portion 31 and an ogive nose portion 32. This object 30 may be any one of several articles such as a laminated fiber reinforced plastic housing for a radar antenna, a mandrel for use in molding such a housing, or simply a woven, curvilinear fabric according to the present invention extended to its full shape for which it is woven. According to the invention, improved fabrics of uniform density may be woven conforming with a relatively high degree of accuracy to the shaped surface of the object 30. The practice of the invention is equally applicable to the weaving of fabrics of many other shapes, the object shown in FIG. 1 being illustrated because of its relative simplicity, and because of its ogive portion 32 which is of a compound curvilinear contour.

A fabric 36 is shown in FIGS. 2 and 2a including a section 38 shaped to conform to the surface of the object 30. This fabric is woven in tubular form, the filling being laid alternately in upper and lower sheds, and selected ones of the warp ends 42 being floated, i.e., being dropped from the weave as the section 38 is tapered from the cylindrical portion 44 toward its apex 46.

According to one embodiment of the invention, the take-up rates of different respective ones of the warp ends 42 are varied as the weaving progresses to curve the fill threads into predetermined arcuate positions, producing puckered portions 48 in the fabric. The fabric, even though woven on a flat loom is not itself flat, but includes, belled, or puckered portions 48 which expand outwardly when the fabric is extended to conform to the contour of the nose portion 32 of the object 30. These puckers 48 are woven into the fabric according to the present invention in all cases where the fabric is shaped to conform to a non-developable surface. In the case of a developable surface, the puckers are absent, but the fill threads are arcuately disposed across the warp in the tapering portions.

The need for the puckers is readily apparent in those cases where the fabric must conform to non-developable surfaces. In the case of developable surfaces such as right circular cones, the fill threads are curved in order that they may extend in substantially circular lines (or, more accurately, helical lines, when the picking travel is taken into account) around the fabric when it is extended, and not form cusps along the drop lines 50, where the warp ends 42 are dropped or taken-up in the weaving to taper the fabric.

If, as in the prior art, the fill threads are not curved during weaving, the fabric may be made to conform to tapering developable surfaces such as right circular cones, but when such a fabric is thereafter extended, the fill threads are distorted out of a desired uniform, helical disposition and form undesirable cusps along the drop lines 50, pointing generally away from the apex of the fabric. This distorted, or skewed disposition of the fill threads reduces the so-called hoop strength of the fabric, and also tends to introduce non-uniformities in the fabric density, especially if the fabric is stretched appreciably.

Moreover, surfaces of compound curvature, and those having both cylindrical and tapering portions are generally not developable, and fabrics of uniform density conforming thereto cannot readily be woven by previous methods.

Cam-Shaped Take-Up Roll

Figure 3:
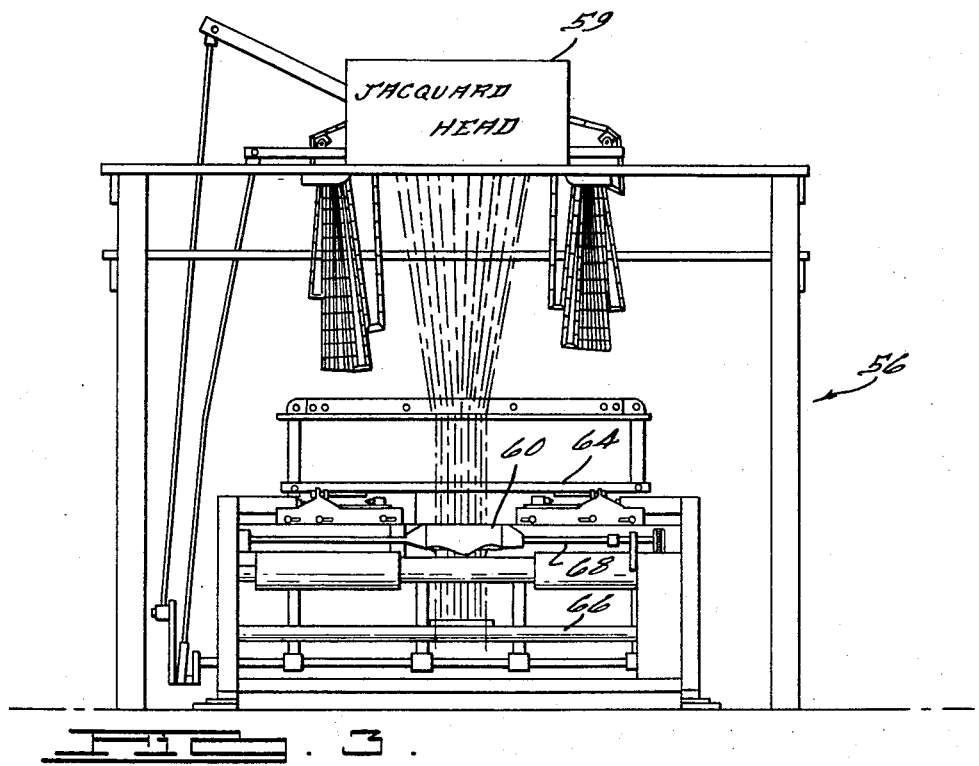
FIG. 3 is a partly schematic, front elevational view of a Jacquard loom, as modified for weaving according to one embodiment of the invention.

The fabric 36 illustrated in FIGS. 2 and 2a, as well as fabrics of many other desired shapes, may be woven according to the invention upon a flat loom 56, as shown in FIGS. 3 and 4, using a creel 58 to supply the warp and a conventional Jacquard head 59 to shed it. The loom 56 is provided with a specially shaped take-up roll 60 over which the fabric 36 is trained as it comes from the lay 64 of the loom. Otherwise, the loom 56 may be entirely conventional.

The take-up roll 60 is especially shaped as hereinafter described to effect variations in the feed rates of selected ones of the warp ends to produce curvilinear shaping of the fabric according to the principles of the invention. The method of punching the Jacquard cards to produce tapering of the fabric by dropping selected ends, and to weave the fabric in either tubular or open form is sufficiently well known not to require detailed discussion herein. The woven fabric is trained over the shaped take-up roll 60 and drawn down to a cloth beam 66. Both the take-up roll and the cloth beam are rotatively advanced in incremental steps in conventional fashion as the weaving progresses. The tensions on the individual warp ends may be controlled by any desired mechanism (not shown) such as weights frictionally engaging the individual warp ends in a conventional manner.

The take-up roll 60 may comprise a series of separate cams all rigidly mounted in fixed relationship to each other upon a shaft 68, but preferably the cams are faired together to form a smoothly tapered roll as illustrated. The chart shown in FIG. 5 illustrates the first step in the determination of the shape of the take-up roll 60 for weaving a fabric conforming to a surface having a plane of symmetry. As an illustrative example, the surface of the object 30 may be considered. Cam-shaped take-up rolls according to the invention may be used for weaving fabric to conform closely to any surface having a plane of symmetry, but the principles of the determination of the roll shape may be fully understood from the following example in which the surface to be considered is symmetrical about an axis.

The determination of the shape of the take-up roll 60 for weaving a curvilinear fabric is based on a polyconic principle. The surface to be fitted by the fabric is thought of as being made up of a series of conic frustums, which may be made sufficiently short to approach the actual surface as closely as desired. The take-up roll 60 is shaped to impart curvature to the fill threads substantially as if weaving a fabric to conform to a series of conic frustums, each frustum having a different slope.

Referring now to FIG. 5, the curved surface 70 shown therein represents one half of the surface of the object 30, being all of the surface lying on one side of an arbitrarily selected plane of symmetry. Reference coordinates are drawn upon this plane including a longitudinal axis 101 coincident with the axis of the surface 70, and a transverse axis 81 lying in the plane of the base 81" of the surface. Uniformly spaced transverse grid lines 82 to 90 are drawn parallel to the transverse axis 81 in the plane.

The peripheral dimensions of the surface 70 are translated to the plane of symmetry, to produce what may be termed a "true length diagram" of the surface 70. Transverse measuring lines 82' to 89' are drawn on the surface 70 in planes parallel to the plane of the base 81". These measuring lines 82' to 89' are spaced apart equal distances as measured along the curved surface 70, and the spacings are, for convenience, made equal to the spacings bebtween the transverse grid lines 81 to 90. The length of the base 81' and of the measuring lines 82' to 89', as taken along the curved surface 70, are transferred to corresponding ones of the transverse grid lines 81 to 89, centering each length upon the longitudinal axis 101, and appropriately marking its end points (not designated). The procedure may be thought of as a flattening of the curved measuring lines upon the plane of symmetry without any decrease in their length. Their spacings, too, are flattened and reproduced upon the plane.

The end points of the lengths so laid out are then connected by a smoothly curved line 74, which may be said to define the "flattened shape" of the surface 70, or to constitute its "true length diagram." It will be appreciated that although the arcuate lineal dimensions of the surface 70 may be transferred accurately to the plane, the curve 74 does not represent a development of the surface 70 in the geometrical sense, and the area enclosed within the curve 74 differs substantially from the area of the surface 70.

Since the fabric to be woven must conform to the surface 70, the next step in the determination of the required shape of the cam-shaped roll 60 provides correction factors, which indicate the required differential advance of the warp as a function of both the progress of the weaving and the positions of the different respective warp ends across the width of the warp. In effect, weaving according to the present embodiment of the invention is done as though one were weaving a flat fabric shaped to conform to the true-length diagram, except that the warp is differentially advanced to draw the fill threads into arcuate positions to impart curvature to the fabric. The Jacquard cards are punched on the basis of the true-length diagram, as though for weaving a flat fabric conforming to the true-length diagram. The warp runs parallel to the longitudinal coordinate axis 101, and the fill threads are laid parallel to the transverse lines 81 to 90.

The principles of curvilinear weaving with the cam-shaped roll 60 may perhaps be most simply described in connection with a right-circular cone, a true-length diagram 91 of which is illustrated in FIG. 6. This true-length diagram 91 may be constructed in an exactly analagous manner to the construction of the true-length diagram 74 of the surface 70. The true-length diagram 91, it will be seen, is an isosceles triangle having a height 92 equal to the slant height of the cone. The developed shape of the cone includes that portion of the true-length diagram 91 bounded by the arc 93, which is drawn on a radius equal to the height 92 of the triangle and centered on the apex 94. Now, in weaving with a cam-shaped roll 60 according to the present embodiment of the invention, the warp is laid parallel to the height 92 of the triangle and the first fill thread is laid in the warp along a straight line corresponding in length and position to the base 95 of the triangle. As successive fill threads are woven into the warp, the warp is differentially advanced to draw the first fill thread out of linearity and into an arcuate position approximately conforming to the position of the arc 93. In the case of the right circular cone, the successive fill threads are drawn to arcuate positions having successively smaller radii of curvature, so that when the fabric is completed it approximates the developed shape of the cone and does not conform to the true-length diagram. Moreover, each one of the fill threads lies approximately on an arc concentric with the base arc 93, so that when the fabric is extended to its true shape the fill threads lie substantially in single circles.

The differential advance of the warp required to draw the first fill thread into position along the arc 93 is such that the central warp end, lying along the height line 92, is advanced a substantial distance while the edge warp ends are advanced to a lesser degree. The differential in travel between the central and the edge warp ends is equal to the distance along the height line 92 between its intersection with the arc 93 and the chord 96 of the arc, which chord is drawn between the intersections of the arc 93 with the legs 97 of the triangle. The warp advance differentials applicable to subsequent fill threads are analogously derived, based on successive arcs concentric with the arc 93.

Thus, in the case of the first woven fill thread in the cone, the differential between the advance of the central warp end and the edge warp ends may be represented by the distance along the height line 92 between its intersection 98 with the fill thread, and its intersection 99 with the chord 96. Similarly, a like measurement may be made for any desired fill thread along the length of the fabric. Also, for any given fill thread, the differential between the central warp end and any other desired warp end intermediate between the central one and the edge ones may be found by drawing successively shorter chords of the arc involved. For example, for the intermediate warp end indicated by the dotted line 92′, the correction factor, or differential at the first pick may be found by first drawing a line 97′ from the apex 94 of the triangle to the intersection of the end 92′ and the base 95. The chord 96′ passing through the intersection of the line 97′ and the arc 93 determines the correction factor, or differential for the intermediate warp end 92′. This differential is the distance between the point 98 and the intersection 99′ of the chord 96′ with the height line 92.

The cam-shaped roll 60 is shaped to accomplish the curvature of successively laid fill threads by differentially advancing the warp after each fill thread is beaten up. When weaving fabrics shaped to conform to surface contours other than right circular cones, the roll shape required for properly advancing the warp is determined on a polyconic principle, i.e., as if the surface were made up of a plurality of conic frustums, each frustum having a different slope.

Returning now to FIG. 5, and assuming that the surface 70 is of circular cross section throughout its length, tangents 114 to 119 to the surface 70 are drawn on the reference plane. These tangents meet the surface 70 at the measuring lines 84′ to 89′ and are extended to the longitudinal axis 101. They may be thought of as representing slant heights of cones, frustums of which constitute the surface 70. These tangents 114 to 119 are used as radii to construct arcs 134 to 139 on the true-length diagram 74, as shown in FIG. 7. The tangent 114 drawn to the surface 70 at the measuring line 84′ serves as a radius for the arc 134 drawn tangent to the transverse grid line 84 and centered on the longitudinal axis 101. Similarly, the other tangents 115 to 119 are used as radii to draw arcs 135 to 139 tangent to the respective grid lines 85 to 89 corresponding to the respective measuring lines 85′ to 89′ to which tangents were originally drawn.

These arcs 134 to 139 correspond to bases of developed cones, each cone having a different slope because of the compound curvature of the surface 70. Chords 144 to 149 are drawn across these arcs as hereinabove described in connection with the right circular cone shown in FIG. 6. The correction factors, or differentials in the warp advance between the central warp end lying along the axis 101, and the ends passing through the edge of the fabric are the maximum spaces between the chords 144 to 149 and the respective arcs 134 to 139. The correction factors for the intermediate warp ends may be readily determined analogously to the determination of the intermediate correction factors hereinbefore described in connection with FIG. 6. All of the correction factors may be approximated sufficiently accurately for most commercial purposes by taking the longitudinal distances between the transverse grid lines 84 to 89 and the respective arcs 134 to 139 along the different warp ends. This approximation is relatively close in those portions of the fabric where the slope of the surface contour is not steep. As the apex of the fabric is approached, however, the slope steepens and the approximation produces relatively large proportionate errors. For many practical purposes, however, even such relatively large errors may be tolerated, since the actual physical dimensions near the apex are small.

Correction factors are measured for each of several selected warp ends spaced from the central end. Although in practice a relatively large number of such warp ends would be selected, only three 101a, 101b, and 101c are illustrated herein. Correction factors are determined for each of the warp ends 101a, 101b, and 101c at each of the transverse grid lines 81 to 90 that they intersect within the curve 74. The correction factors so determined are transferred to circular diagrams such as those shown in FIGS. 8, 9 and 10, which may be used as templates for making separate cams to be incorporated in the take-up roll 60.

The central cross section of the take-up roll 60 is circular and has a circumference equal to the height of the true-length diagram 74 plus a desired length of overweave, so that each revolution of the take-up roll corresponds to the weaving of one complete length of shaped fabric plus a desired length of overweave. The circles 152, 153 and 154 shown in FIGS. 8, 9 and 10 are each drawn to be equal in size to the central cross section of the roll 60. Each one of these circles represents a respective one of the intermediate warp ends 101a, 101b, and 101c.

Each of the circles 152, 153 and 154 is divided into segments (not separately designated) the arc of each one of the segments being equal in length to the spacing between the transverse grid lines 81 to 90, and an additional segment 158 of arbitrarily selected size being provided for the overweave. In each of the circles, one radius R81 bounding the overweave segment 158 is selected as a starting point, and corresponds to the base grid line 81. Proceeding clockwise around each circle, successive ones of the radii R81 to R90 that separate the individual segments correspond to successive ones of the transverse grid lines 81 to 90.

The correction factors, as determined from the chart shown in FIG. 7, are converted by dividing them by $2\pi$, and, thus converted, are transposed to the corresponding radii. The converted correction factors are measured along the radii inwardly from the circumferences of the circles. In effect, the radii are reduced in length to a degree where they are equal to radii of circles whose circumferences are less than the full circumference of the circles 152, 153, and 154 by the unconverted correction factors. The outer ends of the radii as corrected are connected by smoothly curved lines 152a, 153a, and 154a to define the contours of the templates for the take-up roll cam sections. Each one of the curves 152a, 153a, and 154a defines the cross section of the take-up roll 60 in the plane of the corresponding warp end 101a, 101b, and 101c. The curves 152a, 153a, and 154a may be used as templates to cut separate cams (not shown), each one of which is used as a portion of the take-up roll 60.

The principle of the construction of the template curves 152a, 153a, and 154a may perhaps be best understood by a specific, detailed description of the construction of the first such curve 152a. This curve 152a represents the cross section of the roll 60 in the plane of the warp end 101a. In order to achieve fabric shaping according to the invention and to draw the fill threads into their desired arcuate positions, this warp end must be taken up at a slower rate than the central warp end during a portion of the weaving. The rate of take up for this warp end 101a must also be varied in a controlled manner as the weaving progresses to weave the fabric to conform accurately to the surface 70.

Now, the radius R81 of the circle 152 represents the starting point of weaving, i.e., the fabric will come off the loom from right to left as viewed in FIG. 2 and the curve 152a may be thought of as a cross section of the roll 60, rotating in a counterclockwise direction with the fabric being trained over it. When the filling is laid in the warp in the position of the base grid line 81, the take-up roll will be oriented so that its line of tangency with the fabric intersects the radius R81. During the first portion of the weaving all the warp ends are taken up evenly to weave the cylindrical portion 34 of the fabric. The first portion of the curve 152a, accordingly, coincides with the circumference of the circle 152. At a point between the transverse grid lines 83 and 84, however, the fabric starts to taper, and correction is needed. The first correction factor to be encountered is the one approximated by the distance between the transverse grid line 84 and the arc 134 (FIG. 7) all the correction factors for the curve 152a being taken along the warp end 101a. A point 174 is then marked on the radius R84 that corresponds to the grid line 84. This point 174 is spaced inwardly from the circumference of the circle 152 a distance equal to the first correction factor divided by $2\pi$.

A second point 175 is marked on the next radius R85 spaced inwardly from the circle circumference a distance equal to $\frac{1}{2}\pi$ times the next correction factor, which is the distance from the line 85 to the arc 135. Other points 176, 177, and 178 are similarly established on the succeeding radii R86, R87, and R88, respectively. No correction factor need be taken at the grid line 89 since the warp end 101a is dropped from the fabric before that grid line 89 is reached. All of the points 174 to 178 are then connected together by the smoothly curved template line 152a. This curve 152a is extended either by approximation or by appropriate measurement to a length equal to the complete length of the warp end 101a included in the fabric. It is then extended as directly as desired to the outer end of the starting radius R81.

Separate templates 153a and 154a are similarly made for each of the selected intermediate warp ends 101b and 101c, the longitudinal axis 101 being translated, as heretofore stated, to a full circle. If the fabric to be woven is not symmetrical about the longitudinal axis 101, different templates are required for the warp ends on opposite sides of the axis 101. In the instant case, however, the curved surface 70 illustrated has axial symmetry, and, therefore, two cam sections may be made from each of the templates, one to be disposed on each side of the roll center, and symmetrically spaced therefrom with respect to its matching member.

Cam sections (not separately shown) conforming in shape to the template curves 152a, 153a, and 154a are secured together in alignment upon a common shaft 68 (FIG. 11) and are preferably faired together to form a smoothly curved roll 60 as illustrated. If the surface to be fitted by the woven articles is relatively gently curved, relatively few templates may be required. If it is sharply curved, however, or of irregular character, the grid spaces are preferably made relatively small and a larger number of templates are made to provide a relatively higher degree of correction accuracy and precision. The roll 60 is preferably covered with card clothing 61, sandpaper, or the like for positive driving engagement with the fabric 36.

During weaving with a shaped take-up roll, such as the roll 60 shown in FIG. 11, the entire warp of the fabric is taken up evenly and at a uniform rate as long as it is drawn against the cylindrical portion of the take-up roll 60. When, however, the roll 60 is angularly advanced sufficiently to bring tapered portions of its contour to bear against the fabric, warp ends spaced from the center of the fabric are taken up at a slower rate than the central end, and a curvilinear character is imparted to the fabric.

In the foregoing discussion, the assumption was made that the surface 70 to be fitted by the woven fabric was of circular cross section throughout its length. If this is the case, as it is in many practical instances, cam-shaped rolls shaped according to the method described provide relatively close curvature corrections. If, however, the surface 70 is non-circular in cross section, the correction factors must be multiplied in each case by a further factor, which may be called for convenience the compensating factor. The compensating factor is a measure of departure from true circularity and may be defined as the ratio between the actual transverse grid line length and $2\pi$ times the orthographic projection of the corresponding measuring line on the plane of symmetry. If the true-length diagram of a surface of non-circular cross section is symmetrical about its longitudinal axis, the compensating factors are the same on both sides of the axis. But if the true-length diagram is unsymmetrical with respect to its longitudinal axis the compensating factors must be computed separately for the two opposite sides.

The cam-shaped take-up roll may, alternatively, be made so that its entire circumference corresponds to only the tapering portions of the fabric to be woven such as the puckered portions 48 of the fabric 36 (FIGS. 2 and 2a) and an auxiliary, cylindrical take-up roll 180 may be used during weaving of the straight, or non-tapered portions, as illustratively shown in FIG. 12. In FIG. 12, there is illustrated a loom 56' which may be exactly similar to the loom 56 shown in FIGS. 3 and 4, except that in place of the single take-up roll 60 two take-up rolls 60' and 180 are provided, arranged to be alternately brought into engagement with the fabric 36 being woven. The take-up roll 60' is cam-shaped, and of tapering longitudinal section. Its complete circumference corresponds to the tapered, ogive-shaped portions 38 of the fabric 36. The cylindrical portions 44 of the fabric are woven using the cylindrical take-up roll 180. This arrangement allows greater flexibility in weaving since the lengths of the cylindrical portions of the fabric may be varied as desired without going to the trouble of making up new cam-shaped rolls.

The two rolls 60' and 180 may be mounted upon separate shafts 68 and 182, respectively, journalled in a pair of end plates 184 and 186, which may be rotated to bring one or the other of the rolls 60' and 180 into position to engage the fabric 36. The end plates 184 and 186 may be rotatably mounted upon any convenient supports upon the loom 56' and may be controlled by means of a hand crank 188. Rotational drive for the take-up rolls 60' and 180 may be provided by a chain and sprocket arrangement (not generally designated) mounted upon one of the end plates 186. This drive may, illustratively, comprise a central sprocket 190 fixed upon a shaft 192 driven by the conventional roll drive chain 194. The central sprocket 190 engages and drives a chain 196 which is trained around sprockets 198 and 200 fixed upon the shafts 68 and 182, respectively.

During weaving of the developable, or non-tapering portions of the fabric, the cylindrical roll 180 may be used to take up all of the warp ends evenly and at a uniform rate. When weaving of the tapering sections of the fabric commences, the crank 188 is operated to reverse the positions of the rolls 60' and 180, bringing the shaped take-up roll 60' into engagement with the fabric 36 to take up the different warp ends at different varying rates to shape the fabric. Latch dogs such as the dog 202 may be provided, if desired, to engage one or both of the end plates 184 and 186 to prevent accidental movement of the two rolls 60' and 180 about their common axis.

It will be appreciated that, particularly for weaving articles of relatively complicated shapes, a second shaped take-up roll may be substituted in place of the cylindrical roll 180. Also, more than two take-up rolls may be mounted upon the end plates 184 and 186 for selective alternate use.

Bent Bar Weaving

Shaped fabric weaving according to the invention may also be accomplished using a modified form of a conventional bent bar take-up roll assembly as illustrated in FIGS. 13 to 15. These take-up rolls 220 and 222 may be similar to those used in the textile industry as an expander preceding a squeeze roll or padding operation. They are geared together, as schematically indicated, by the gears 224 and 226, and mounted for rotation, each roll about its own arcuate axis. The rolls 220 and 222 may be driven from both ends by any convenient means such as a pair of synchronized electric motors 223. They may be made of separate, interlocking cylindrical sections 225 mounted upon fixed, arcuate bars (not separately designated) and covered with padding material and a flexible, elastic cover 227 capable of maintaining its surface characteristics under the continual flexing imposed by the roll rotation.

According to the present invention, the pair of rolls 220 and 222 are mounted upon a rigid frame 230, which is pivoted upon fixed supports 232 and 234 so that the rolls 220 and 222 may be swung about a straight axis, as indicated by the dotted line 236, independently of and simultaneously with their rotation about their own arcuate axes.

Weaving of curvilinear fabrics having an axis of symmetry may be accomplished with the bent bar take-up roll assembly, using the same basic principles hereinabove described for varying the take-up rates of different warp ends as the weaving progresses. The straight axis 236 passes through the apex 238 of the meeting line 239 of the rolls 220 and 222. During weaving, the rate of rotation of the rolls about their arcuate axes is maintained constant (with respect to the picking rate), and, therefore, the center of the warp, which is drawn through the apex point 238 is advanced at a constant rate regardless of the rotation of the rolls about their straight axis 236.

The diameter of the rolls 220 and 222, and their curvature may be varied as desired, and are not critical in the practice of the invention, except that the curvature of the roll axes is preferably sufficient to accomplish the full required shaping correction with a minimum angular travel of the rolls about their straight axis 236. If too much angular travel about the straight axis 236 is used, shaping accuracy may be adversely affected since the fabric may then be drawn too far along one of the rolls 220 or 222 away from the meeting line 239.

FIG. 15 illustrates a pin type bent bar take-up roll 240, which may be used in place of the roll assembly 220 and 222 shown in FIG. 13 and in an exactly similar manner thereto. The pins 244 projecting radially from the roller 240 grip the fabric and advance it at a controlled rate similarly to the squeeze action of the pair of rollers 220 and 222. The roll 240 may, alternatively, be covered with card clothing to grip the fabric in place of the pins 244.

The rotation of the take-up rolls 220 and 222, or of the take-up roll 240 about the straight axis 236 that is required to shape a fabric being woven to a desired contour may be determined from the true-length diagram of the contour, using correction factors determined as hereinabove described in connection with the determination of the shape of the cam-shaped take-up roll 60. Referring again to FIG. 7, the curvature corrections required to shape a fabric using the bent bar take-up device are exactly the same as those heretofore described, except that only the correction factors along the 'drop line" need be used, i.e., only the correction factors taken at points along the curve 74. The rotation of the bent bar rolls 220 and 222 about the straight axis 236 is adjusted to provide the needed corrections along the drop line as the weaving progresses, and when this is done the axial curvature of the rolls 220 and 222 automatically produces the proper curvature correction in the body of the fabric, i.e., in that portion of the fabric represented by the area enclosed within the curve 74.

The correction factors are determined as heretofore described, and in operation the rolls 220 and 222 are rotated about their straight axis 236 to vary the rates of take-up of all the warp ends except the center end represented by the longitudinal axis 101, which end extends through the apex 238 of the meeting line 239 of the rolls, and passes through the straight axis 236. The rolls 220 and 222 are not rotated about their straight axis 236 during weaving of cylindrical, or non-tapering portions of the fabric. Thus, when weaving from left to right as viewed in FIG. 7, no rotation of the rolls about the axis 236 is required until the pick represented by the transverse grid line 84 is approached.

Between the point at which the fabric first starts to taper and this pick (grid line 84) the rolls are rotated sufficiently to permit the warp end 101c that passes through the intersections of this pick with the drop line (the curve 74) to lag a distance equal to the correction factor for that end at that pick. As hereinabove described, this correction factor is equal to the distance between the line 84 and the chord 144. As the weaving continues, the rotation of the rolls 220 and 222 about their straight axis 236 is continued at an accelerating rate so that as each end is dropped from the weave it has lagged with respect to the center end (the axis 101) a distance equal to the full correction factor taken at the drop line 74. For example, taking the warp end represented by the broken line 101d, it will be seen that it is dropped from the weave approximately at the pick represented by the transverse grid line 88. The correction factor for this end at the drop line 74 is represented by the distance between the line 88 and the chord 148. The total, cumulative rotation of the rolls 220 and 222 about their straight axis 236 is made sufficient to permit this end 101d to lag behind the center end by the full correction factor at the time that the pick represented by the line 88 is woven. The total length of the warp end 101d from the base 81" of the fabric to the drop line 74 is less than the corresponding length of the center warp end 101 by an amount equal to this correction factor (the corresponding length of the center warp end 101 being taken in this case from the base 81" to the pick represented by the grid line 88).

Any convenient means may be provided to accomplish the desired rotation of the roll assembly frame 230 about the straight axis 236 in conformity with the correction factor system described. Illustratively, this means may comprise a hand crank 241 attached to the shaft 243 of the frame 230, so that the rotation may be accomplished manually. For convenience, a dial and pointer 245 may be provided to indicate the angular position of the rolls 220 and 222 about the axis 236. In this event, the correction factors would be converted to angular displacement factors and the weaver should be provided with a chart indicating desired angular correction factors as a function of the weaving progress. In most instances, however, a variable speed transmission device (not shown) may be connected between the take-up drive chain 194 (FIG. 4) and the shaft 243 of the roll assembly frame 230. The driving ratio of the transmission may then be varied in response to the operation of the Jacquard head, the pertinent information being punched upon the cards. The connection between the drive chain 194 and the shaft 243 may comprise any of many known, continuously variable speed transmission devices, such as, for example, a wheel and disc transmission in which the rim of a driving wheel frictionally engages the face of a driven disc, the wheel being radially movable across the face of the disc to vary the drive ratio. Other equivalent variable speed drive structures may be used according to choice.

It is appreciated that the curvature corrections achieved in the bent bar take-up method of weaving differ from the curvature corrections accomplished by the cam-shaped take-up roll. The differences arise because in the bent bar method the curvature correction for each warp end is the full, cumulative correction factor, while in the cam-shaped take-up roll the curvature correction is slightly less than this amount. The differences, however, are relatively small and in both cases sufficiently accurate shaping is accomplished to achieve the principal objects of the invention and to weave fabrics conforming closely to predetermined surface contours. The cam-shaped take-up roll method is more versatile than the bent bar method, since such rolls may be shaped for weaving curvilinear fabrics having no axial symmetry. On the other hand, the bent bar method has the advantages of structural simplicity, and flexibility in that one bent bar assembly may be used for weaving fabrics of many different sizes and shapes.

As shown schematically in FIG. 16 (sheet 2), the bent bar take-up system readily lends itself to weaving from a yarn beam 280 in place of the creel 58 hereinabove described. Ordinarily, variations in the rates of take-up of different warp ends require the use of a variable let-out device, such as a creel, or a multisection yarn beam of relatively great flexibility in order to insure proper tensioning of the warp. According to the present invention, however, the slack created by the variable take-up rolls 220 and 222 may be taken up by a set of auxiliary take-up rolls 282 and 284 mounted between the warp beam 280 and the lay of the loom, which in FIG. 16 is indicated by the broken line 286. The auxiliary bent bar rolls 282 and 284 are rotated about a straight axis similarly to the take-up rolls 220 and 222, but in the opposite direction. The auxiliary rolls 282 and 284 are driven synchronously with the take-up rolls 220 and 222, taking up slack in the warp that otherwise would be developed by the take-up rolls 220 and 222, and maintaining an even tension across the width of the warp as it is let out from the beam 280.

Pivoted Dent Wire Reed

Weaving of shaped fabrics may also be accomplished according to another embodiment of the invention, using a reed 400 as illustrated in FIGS. 17 and 18. The dent wires 402 of this reed 400 are pivoted at one end upon a header frame member 404 so that they may be swung through a vertical arc parallel to the direction in which the reed sweeps. The ends of the dent wires 402 opposite from the header 404 are extended through slots 406 formed in the shuttle track 408, and are connected to individual retracting springs 405. A shaped back-up roll 410 is mounted upon a shaft 412 immediately behind the dent wires 402. The shaft 412 is journalled in slidable supports 414 which ride on ways 416. The roll 410 may be driven into and out of engagement with the dent wires 402 by means of a pneumatic cylinder assembly 418 connected to the shaft 412 and mounted upon a fixed bracket 417 on the lay of the loom. The cylinder 418 is energized to advance the roll 410 into engagement with the dent wires 402 when the reed sweeps to its beat up position (as shown in solid lines in FIG. 18), and is reversed to retract the roll 410 when the reed is retracted.

The roll 410 is shaped to selectively position the dent wires 402 to beat up the fill threads of a fabric to controlled curvilinear positions. The roll 410 is rotatively driven by any desired mechanism such as a ratchet 419 driven by a pawl (not shown) pivoted on the loom frame, to present a new line of contact to the dent wires 402 on each successive pick. Successive fill threads are thus beaten up into different, predetermined curvilinear positions. The roll 410 is shaped to curve the reed 400 to beat up the fill threads into arcuate positions corresponding to the arcs 134 to 139 shown in FIG. 7.

The shape of the roll 410 may be determined in an exactly similar manner to the shape of the cam-shaped take-up roll 60 (FIG. 11) heretofore described, with the exception that because of the leverage factor, the size of the roll 410 may be varied. For example, if the warp to be woven is threaded through the reed 400 immediately adjacent to the shuttle track 408, and the roll 410 is placed half-way between the header 404 and the track 408, the radial dimensions of the roll 410 may be half as great as those of the roll 60 heretofore described. The slots 406 are made sufficiently long to accommodate the full travel of the dent wires 402 required for the largest correction factor.

Weaving in Open Form

A novel fan-shaped reed 300 for weaving curvilinear fabrics in open, or extended form is illustrated in FIG. 19 and includes curved upper and lower dent wires 302 and 304, respectively. The determination of the exact curvatures of the dent wires required for weaving fabrics to conform to different contours will be described hereinafter, but for the present it should be noted that such curvature is necessary in this method of weaving in order to maintain a uniform warp density in the woven fabric. In operation, a warp is threaded through the reed 300 in the usual manner, and means are provided to shape the warp to conform to a desired surface contour when the reed sweeps forward to beat up a fill thread. When the reed is retracted, the shaping means are de-energized or otherwise made ineffective, and a shed is formed in the warp for the laying of another fill thread. The dent wires 302 and 304 of the reed 300 are curved in such a way that when the shaping means shape the fabric to a desired surface contour, the wrap ends are always uniformly spaced one from another. The curvatures of the dent wires 302 and 304 are coordinated with the shaping means.

According to one specific embodiment of this feature of the present invention, as shown in FIGS. 20 to 24, a fan reed 301 of double construction is provided, including front and rear dent wires 302' and 304', and 302" and 304", respectively, all mounted in a generally cuboidal frame 306, and preferably reinforced by central transverse members 308 and 310. The front transverse member 310 is preferably wedge shaped, as best shown in FIG. 23 to minimize any tendency it may have to form gaps between the upper and lower halves of a fabric woven in tubular form. The fill thread tension tends to close such gaps automatically, but the fabric uniformity may be somewhat improved if the gaps are minimized to start with.

Each one of the dent wires 302', 304', 302" and 304", except the central ones at the middle of the reed, is of L-shaped horizontal section, having a forwardly facing web portion 312 and a transverse flange 314. The transverse flanges 314 are shaped so that their edges lie equidistantly from the next adjacent wires, forming warp guide slots, or dent spaces 316 of uniform width but curved disposition. The rear dent wires 302" and 304" are arranged similarly to the front ones and in opposition thereto. The warp ends (not shown) are individually threaded through upper and lower tubes 320 and 322, which are slidably mounted between the front and rear dent wires for vertically travel in the dent spaces 316. The tubes 320 and 322 are provided with out-turned annular flanges 324 near their ends, which flanges bear against the dent wires for positive guiding action.

The tubes 320 and 322 are individually supported upon flexible heddles 326 and 328 which function to position the tubes vertically during weaving. The heddles 326 and 328 extend through a perforated spacer plate 329 fixed at the top of the reed, and are slidably attached to guide rods, or bars 330 and 332 which extend over the reed and span its sweep. At the rear (to the left as viewed in FIGS. 20 and 21) these guide bars 330 and 332 are suspended on Jacquard cords 336, which may be actuated in a conventional manner to raise and lower the rearward ends of the bars 330 and 332. Forwardly, the bars 330 and 332 extend over a pair of shaped rolls 340 and 342, respectively, and through a comb, or slotted guide 344, which retains the bars in their desired transversely spaced relationship. Individual biasing weights 346 are suspended from the bars 330 and 332 to assist in keeping them in their desired position and in contact with the rolls 340 and 342. The rolls 340 and 342 are shaped to position the forward ends of the guide bars 330 and 332 vertically. They are shaped according to the surface contours desired in the fabric to be woven, and are rotatably mounted so that the relative vertical positions of the guide bars may be varied as the weaving progresses by angular movement of the rolls.

In the apparatus illustrated, the warp guide tubes 320 mounted in the upper part of the reed 301 (above the reinforcing bar 310) are supported on the heddles 326 that slide on the upper bank guide bars 330. These upper guide bars 330 are supported at their forward ends upon the upper shaped roll 340, which accordingly is shaped to the surface contour desired in the upper portion of the fabric to be woven. Successive, angularly spaced, longitudinal sections of this roll 340 are geometrically similar in shape to successive, spaced cross sections of the upper half of the fabric. The length of the roll 340 may be arbitrarily determined, and its shape correspondingly adjusted so that its radial dimensions accurately conform to the corresponding radial dimensions of the fabric cross section. In practice, it may be desirable to make the roll relatively long to permit a relatively wide spacing of the guide bars 330 and 332 to minimize any tendency toward binding or jamming.

The lower warp guide tubes 322 mounted below the reinforcing bar 310 are preferably supported by a separate bank of heddles 328 that ride on the lower guide bars 332. These lower guide bars 332 are arranged similarly to the upper ones, being supported at their forward ends upon the lower shaped roll 342, which is shaped to conform to the lower half of the surface contour. Since the guide bars 332 are supported on top of the roll 342, the contour of the roll is made complementary to the contour of the lower half of the fabric.

It will be appreciated that, alternatively, similar shaping could be accomplished with a single roll, the upper and lower guides 330 and 332 being held in contact with the top and bottom, respectively, of the single roll. In this case, the upper and lower portions of the roll would be shaped to conform to the upper and lower portions, respectively, of the fabric to be woven.

The rolls 340 and 342 are arranged to be rotatively driven synchronously with the weaving, so that vertical positions of the forward ends of the guide bars 330 and 332 are adjusted anew after each pick. Such rotational drive may be accomplished by any desired means (not shown) such as ratchet wheels fixed to the rolls and driven by pawls actuated by the loom mechanism, so that the rolls 340 and 342 are angularly advanced as the weaving proceeds. For greatest shaping accuracy, the total number of angular steps is made equal to the total number of picks in one length of the fabric. During weaving of cylindrical (non-tapering) portions of fabrics, the rolls need not be advanced but may be held stationary.

In operation, the vertical positions of the individual warp ends are determined either by the Jacquard cords 336 or by the rolls 340 and 342, depending on whether the reed 301 is advanced or retracted. When the reed 301 is advanced (moved to the right as viewed in FIGS. 20, 21 and 24) to its beat up position, the heddles 326 and 328 are drawn forwardly along the guide bars 330 and 332 to positions adjacent to the shaped rolls 340 and 342, and the warp is shaped to conform to the contours of the rolls. When the reed is fully advanced, the warp is controlled substantially only by the rolls 340 and 342, and the Jacquard mechanism does not substantially affect its position.

When the reed 301 is retracted preparatory to a shuttle pass, the heddles 326 and 328 are drawn rearwardly, into positions adjacent to the Jacquard cords 336 (as illustrated in FIG. 20) and the warp may then be positioned by the Jacquard mechanism, the rolls 340 and 342 being substantially ineffective. When the reed is retracted, the Jacquard mechanism may be actuated in the regular way to shed the warp for weaving.

Thus, when the reed 301 is retracted, the Jacquard mechanism is effective for shedding the warp, and when the reed is advanced, the shaping rolls are effective to position the warp to conform to the desired surface contour.

In weaving with the fan reed 301, vertically movable shuttle boxes are preferably used, and separate sheds are formed for the upper and lower portions of the fabric above and below the central reinforcing bar 310 of the reed. The upper guide tubes 320 are preferably fully raised to their widest spacing when the shed for the lower portion of the fabric is formed. This procedure minimizes any chance of interference, or binding such as might occur between the lower bank heddles 328 and the upper guide tubes 320 if the upper guide tubes were not raised. Fill threads may be laid in both the upper and lower sheds on each pick. Any convenient take-up means may be used to draw the fabric from the loom, preferably a friction type roll without a cloth beam.

The reed 301 is constructed to maintain uniform spacing between the ends of the warp being woven, and must be designed with the desired surface contour in mind. The heddles 326 and 328 are effective to shape the warp along a vertical coordinate, but the reed controls the horizontal displacement of the individual ends. To produce fabric of uniform density, the dent spaces 316 must be so arranged that the warp ends are evenly spaced during every sweep of the reed, as measured around the periphery of the extended fabric.

The design steps in the construction of the reed 300 or 301 are illustrated in FIGS. 25, 26, and 27. The first step comprises drawing successively spaced, cross-sectional contour lines 360 defining the contour of the fabric to be woven. In FIG. 25, there is illustratively shown a set of contour lines 360 representing the upper half of a right circular cone, the lower half of the cone being symmetrical with the upper half, and, therefore, not being separately shown. Each one of the lines 360 represents the intersection of the cone with a plane extending perpendicularly to its axis, the planes of successive ones of the curves 360 being parallel to and equidistant from each other.

Arcs of equal length are spaced off along these curves 360 as indicated by the division marks 362, starting from the intersections of the curves with a perpendicular 364 drawn from the center of the base 366. The division marks 362 of the successive lines are then connected by smoothly curved lines 368. These lines 368 represent successive positions of different ones of the warp ends during weaving of the shaped fabric and define the centers of the dent spaces of the reed. By construction they are everywhere equidistant from each other as measured along the curve of the fabric, and, since during weaving the warp is positioned along the contour lines 360, the warp ends in the finished fabric are evenly spaced and the fabric is of uniform density.

Dent wires are positioned in the reed and curved to define dent spaces located in conformance with the lines 368. If the surface contour to be fitted by the fabric does not have a plane of symmetry, contour lines 360 must be drawn to represent the complete cross section of the surface. If the surface has a plane of symmetry, then the lines 360 may be drawn to represent only half of the surface, and the reed 300 or 301 may have planar, or mirror symmetry. If the surface is symmetrical about an axis, then only one quarter of the surface need be plotted, the entire reed being built up by mating four identical sections.

In weaving according to the open fabric method of the invention, a Jacquard head is used to control the shedding function in the usual manner and to drop selected warp ends from the weave as the fabric is tapered. The rolls 340 and 342 in conjunction with the reed draw the warp into the desired surface configurations during the sweep of the reed. The rolls 340 and 342 are shaped as heretofore explained to position the forward ends of the guide bars 330 and 332 so that the warp is drawn into conformity with one of the cross-sectional contour lines 360, or with a cross-sectional contour line disposed between the lines 360 illustrated, on each sweep of the reed 300. The reed is so constructed that warp ends disposed along any one of the contour lines 360 are evenly and equidistantly spaced one from another along the curved length of the line. Thus, in the completed fabric, the warp ends are uniformly spaced and the fabric is of uniform density throughout when it is extended to its true shape.

Fabrics of almost any desired shape may be woven according to this embodiment of the invention whether or not they are symmetrical in any aspect. The shapes of the rolls 340 and 342 and the curvature of the dent wires 302 and 304 of the reed 300 provide the shaping corrections. Both the rolls and the reed are shaped according to the contour to be imparted to the woven fabric. A relatively high degree of shaping accuracy may be readily attained in weaving according to this method.

Weaving in Folded Form

The weaving of shaped fabrics according to the invention may be facilitated, and in certain instances the strength of the woven fabrics may be improved by weaving the fabrics in folded form, as illustratively shown in FIGS. 28 and 29 (Sheet 6). In weaving tapered portions of shaped fabrics according to the methods hereinabove described, warp ends are dropped from the weave only along the drop line (the curve 74 of FIG. 7) in order to preserve uniformity of fabric density. In certain cases, however, where the surface is sharply tapered, or falls away substantially perpendicularly to the direction of weaving, a relatively large number of ends must be dropped either simultaneously or within a very few picks. The effect of dropping a large number of warp ends at one pick in the fabric along a single drop line is generally undesirable since yarn tension effects and longitudinal stretching of the fabric tends to withdraw the dropped ends slightly into the fabric, creating small gaps which may weaken the fabric.

In order to minimize this effect, the fabric may be woven in folded form as illustrated in FIGS. 28 and 29, so that the ends may be dropped along four or more longitudinally extending lines 420 spaced around the periphery of the fabric. For convenience, relatively stiff selvage, or guide wires 422 are preferably disposed along the center line of the warp to keep the inner, concealed edges of the folds straight and properly aligned. The guide wires 422 are secured to the loom at their ends adjacent to the creel or warp beam, their free ends extending through the reed toward the take-up roll. If more than one wire is used, as shown for example in FIG. 29, they are preferably threaded through heddle eyes and controlled by the Jacquard mechanism.

In weaving folded fabrics, the sequence of the shedding and shuttle operations is determined according to a number of folds to be woven, and whether the fabric is to be woven in open or tubular form. For example, to weave the tubular fabric illustrated in FIG. 28 the sequence may be as follows:

(1) The Jacquard head forms the shed for the upper layer 430 of the fabric;
(2) The shuttle traverses left to right;
(3) The Jacquard head forms the shed for the upper half 432 of the right-hand fold;
(4) The shuttle traverses right to left;
(5) The Jacquard head forms the shed for the lower half 434 of the right-hand fold;
(6) The shuttle traverses left to right;
(7) The Jacquard head forms the shed for the lower layer 436 of the fabric;
(8) The shuttle traverses right to left;
(9) The shed for the lower half 438 of the left-hand fold is formed;
(10) The shuttle traverses left to right;
(11) The shed for the upper half 440 of the left-hand fold is formed;
(12) The shuttle traverses right to left; and
(13) The reed sweeps forward to complete the pick.

On the second shuttle throw along each folded layer of the fabric the fill thread is caught and tensioned by the guide wire 422. This wire is provided to insure proper tensioning of the fill threads since the folded portions of the fabric are out of view of the weaver, and stretching or distortion of the warp ends might go unnoticed if no wire were provided and the warp ends themselves relied upon to tension the filling.

A considerable degree of shaping of fabrics may be accomplished simply by weaving in folds according to the invention and without any other added correction. Preferably, however, one of the shaping methods hereinabove described is used in conjunction with weaving in folds to achieve optimum correction. The degree of correction required, however, decreases in proportion to the square of the number of lines along which warp ends are dropped. For example, when weaving in the flat without any folds, the warp ends are dropped along two "drop lines" spaced 180° apart around the circumference of the fabric (represented by the line 74 of FIG. 7). When weaving in a double fold as shown in FIG. 28, four drop lines 420 are established along which the warp ends may be dropped. The correction factors required to achieve full curvature correction for fabric woven in the form illustrated in FIG. 28 are only one quarter as large as the correction factors hereinabove described. Similarly, the correction factors to achieve full curvature correction for fabric woven with two double folds and having six drop lines 420 are only one-ninth as great as the correction factors required in the case of unfolded fabrics.

The folded form method is of substantial advantage for weaving fabrics of relatively great width such as, for example, fabrics to be used for large balloons, which fabrics may be too large to be woven without folds upon available looms. The capacity of a loom with respect to its width may be readily increased by a factor of two or more by weaving in folds. It will be appreciated that this benefit is not limited to the weaving of curvilinear fabrics, but is equally applicable in the weaving of flat fabrics.

The number of folds it is possible to use is limited by the crowding of the reed and of the heddles as well as by the reduction in speed of weaving occasioned by the necessity to weave the folds. Generally for these reasons, it is preferred to weave without folds and to accomplish fabric shaping solely by one of the shaping methods hereinabove described, reserving the folded method of weaving for weaving fabrics of exceptional width and for those cases where it is desired to minimize the number of ends dropped from the weave along any one drop line.

Fabrics woven according to the invention are characterized by a relatively high degree of uniformity in density, i.e., both the filling and the warp threads are relatively evenly spaced throughout. Moreover, the hoop strength of fabrics according to the invention is relatively high since, when the fabrics are extended to their true shapes, the fill threads are disposed in even helical paths around the fabrics, the fill thread for each pick lying substantially in a circle. This contrasts with previously known tapered tubular fabrics woven on flat, or straight looms, wherein the fill threads are distorted out of planar configurations when the fabrics are extended to their full shapes.

Fabrics according to the invention are particularly advantageous for use in the manufacture of reinforced resin articles, since they greatly facilitate the lay up and permit the use of matched metal molding. In this connection it may be pointed out that heretofore in the plastics industry matched metal molding of fabric reinforced articles has not been practicable because of the difficulty of laying up smooth laminae.

Although the practice of the invention has been described with particular reference to tapered tubular fabrics, it is equally advantageous for use in weaving fabrics of many other shapes such as, for example, open-sides fabrics shaped to conform to boat hull sections, or automobile body sections. It will also be appreciated that the character of the weave of fabrics woven according to the invention may be varied as desired. Patterned effects, or multi-ply fabrics may be woven in shaped form, the patterns and interlocking of plies being achieved conventionally through control of the Jacquard mechanism, or loom harness in the ordinary way. The use of interchangeable shuttles carrying various different fill yarn is also contemplated to achieve pattern effects and to vary the fabric density in a controlled manner.

It should also be pointed out that the principles of fabric shaping according to the invention are effective regardless of the nature of the warp and fill materials incorporated in the fabric. These principles apply equally whether the fabric is made of metal wire, wool, cotton, glass, rayon, or other fiber, or of any other material capable of being formed into thread-like strands and woven into a fabric.

There have thus been described improved curvilinear fabrics and methods of and apparatus for weaving these. The fabrics are generally of improved strength, and according to the methods described may be woven to conform with a relatively high degree of accuracy to any of a large number of surface contours.

What is claimed is:

1. In a flat power loom for weaving fabric material of hollow tapering curvilinear shape, a plurality of warp end guide tubes, a reed having curved dent wires for guiding the movement of said tubes, and a heddle mechanism for shedding said tubes in accordance with the program of a heddle controlling device such as a Jacquard mechanism when the reed is retracted for a shuttle pass and for positioning said tubes in a curved array corresponding to a transverse cross-sectional shape of the fabric when the reed is advanced for beating-up.

2. A loom according to claim 1, the said curved array being such that said warp end guide tubes are substantially equidistant from one another.

3. A loom according to claim 1, said heddle mechanism including means for modifying said curved array synchronously with advance of the weaving operation, whereby to form a curvilinear fabric the transverse cross-section of which varies longitudinally of the fabric.

4. A loom according to claim 1, said heddle mechanism including means for modifying said curved array synchronously with advance of the weaving operation, whereby to form a curvilinear fabric the transverse cross-section of which varies longitudinally of the fabric, said modifying means comprising cam shaped rollers acting on guide bars along which heddles slide into the vicinity of said rollers when the reed is in its beating-up position.

5. In a Jacquard loom having a shedding mechanism the improvement comprising a reed having curved dent wires, a plurality of heddles arranged on said reed for reciprocating vertical travel with respect thereto, a plurality of elongated guides mounted adjacent to said reed and extending generally in the direction of the beat-up thereof, one end of each one of said guides being supported from and vertically positionable by the shedding mechanism of said loom, the opposite end of each one of said guides being supported in a predetermined position relative to other ones of said guides, each one of said heddles being vertically supported and horizontally slidable upon a different one of said guides.

6. In a Jacquard loom having a shedding mechanism the improvement comprising a reed having curved dent wires, a plurality of heddles mounted upon said reed and vertically reciprocable thereon, each one of said heddles being vertically supported upon and positionable by a separate elongated guide, said guides being vertically movable at one of their ends by the shedding mechanism of said loom and being vertically movable at their other ends, and means controllable to position said other ends when said reed sweeps forward to its beat-up position.

7. In a Jacquard loom the improvement comprising a reed having curved dent wires, warp positioning heddles mounted upon said reed and vertically reciprocable with respect thereto, means to connect said heddles to the Jacquard mechanism for actuation thereby when said reed is retracted, and means to position said heddles vertically independently of said Jacquard mechanism when said reed is advanced to its beat-up position.

8. In a Jacquard loom of the type including a Jacquard head having vertically extending heddle actuating cords, and a lay swingable between a retracted and an advanced position, the improvement comprising a reed fixedly mounted upon said lay and having curved dent wires, a plurality of heddles mounted adjacent to said reed for swinging travel with said lay but vertically reciprocable with respect thereto, means to connect said heddles with said cords for actuation thereby when said lay is in its retracted position, and means independent of said cords to position said heddles vertically when said lay is in its advanced position to draw a warp threaded through said heddles and said reed into a predetermined arcuate position.

9. In a Jacquard loom the improvement comprising a reed having curved dent wires, and shaping means selectively to raise and lower warp ends to predetermined positions to cause a warp threaded through said reed to conform to predetermined transverse curves, said dent wires being curved to maintain substantially uniform spacings between the different ends of said warp when said warp is conformed to said curves.

10. In a Jacquard loom the improvement comprising a reed having curved dent wires, and shaping means selectively to raise and lower warp ends to predetermined positions to cause a warp threaded through said reed to conform to predetermined transverse curves, said transverse curves conforming to successive longitudinally spaced cross-sectional contours of a predetermined curvilinear surface, and said dent wires being curved to space warp ends of said warp uniformly and evenly apart one from another when said warp is conformed by said shaping means to said curves.

11. A reed having curved dent wires arranged in two spaced apart rows, the dent wires of one row being in direct opposition to the dent wires of the other row, and a plurality of warp end guide tubes mounted between said rows and vertically movable with respect to said dent wires, said tubes being confined by said dent wires for travel in separate curved paths defined by said dent wires.

12. Weaving apparatus comprising a reed movable between a retracted and a beat-up position and having curved dent wires arranged in two spaced apart rows, the dent wires of one row being in direct opposition to the dent wires of the other row, a plurality of warp end guide tubes mounted between said rows and vertically movable with respect to said dent wires, said tubes being confined by said dent wires for travel in separate curved paths defined by said dent wires, a plurality of elongated guides disposed above said reed and longitudinally spanning its path of travel, heddles slidably mounted on said guides and individually connecting said tubes with different ones of said guides, shedding mechanism supporting the ends of said guides adjacent to the retracted position of said reed and operable to move said guides to shed a warp threaded through said tubes when said reed is in its retracted position, a shaped roll supporting the ends of said guides adjacent to the reed beat-up position in predetermined vertically spaced relationship, said roll being rotatable to vary said spaced relationship, said heddles being fixed for longitudinal travel with said reed.

13. Weaving apparatus according to claim 12 including central reinforcing bars extending transversely across said dent wires, different ones of said tubes being mounted respectively above and below said reinforcing bars, said guides being arranged in two banks, the guides of the first one of said banks being supported at one end in contact with a first shaped roll, the guides of the second one of said banks being supported at one end in contact with a second shaped roll, all of said tubes that are mounted above said bars being connected to the guides of said first bank, and all of said tubes that are mounted below said bars being connected to the guides of said second bank.

References Cited in the file of this patent

UNITED STATES PATENTS

| | | |
|---|---|---|
| 38,929 | Hensel et al. | June 16, 1863 |
| 595,596 | Bergner | Dec. 14, 1897 |
| 1,095,740 | Seidman | May 5, 1914 |
| 1,135,701 | Langer | Apr. 13, 1915 |
| 1,578,447 | Lawton | Mar. 30, 1926 |
| 1,735,467 | Lipper | Nov. 12, 1929 |

FOREIGN PATENTS

| | | |
|---|---|---|
| 10,111 | Great Britain | of 1895 |
| 105,458 | Great Britain | Apr. 19, 1917 |